(12) United States Patent
Cai et al.

(10) Patent No.: US 6,216,219 B1
(45) Date of Patent: *Apr. 10, 2001

(54) MICROPROCESSOR CIRCUITS, SYSTEMS, AND METHODS IMPLEMENTING A LOAD TARGET BUFFER WITH ENTRIES RELATING TO PREFETCH DESIRABILITY

(75) Inventors: George Z. N. Cai; Jonathan H. Shiell, both of Plano, TX (US)

(73) Assignee: Texas Instruments Incorporated, Dallas, TX (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/000,937

(22) Filed: Dec. 30, 1997

Related U.S. Application Data

(60) Provisional application No. 60/033,958, filed on Dec. 31, 1996.

(51) Int. Cl.[7] .................................................. G06F 9/32
(52) U.S. Cl. ........................................... 712/207; 712/237
(58) Field of Search ..................................... 712/207, 237

(56) References Cited

U.S. PATENT DOCUMENTS 5,377,336 * 12/1994 Eickemeyer et al. ................. 395/375
5,748,976 * 5/1998 Taylor .................................. 395/800

\* cited by examiner

*Primary Examiner*—David Y. Eng
(74) *Attorney, Agent, or Firm*—Robert D. Marshall, Jr.; W. James Brady, III; Frederick J. Telecky, Jr.

(57) ABSTRACT

A microprocessor (12) comprising a memory system (20) for outputting data in response to an address, wherein the memory system is further operable to receive a prefetch request having a predicted target data address. The microprocessor further includes a load target circuit (56 or 112), which comprises a first plurality of entries (116) of a first length and a second plurality of entries (114) of a second length. Each of the first plurality of entries comprises a value (ADDRESS TAG) for corresponding the entry to a corresponding first plurality of data fetching instructions. Further, each of the first plurality of entries further comprises a value (POINTER A) for indicating a corresponding predicted target data address. Each of the second plurality of entries also comprises a value (ADDRESS TAG) for corresponding each of the second plurality of entries to a corresponding second plurality of data fetching instructions. However, each of the second plurality of data fetching instructions is of a type for which it is undesirable to issue a prefetch request.

34 Claims, 10 Drawing Sheets

60a — EMPLOYEE NAME
60b — I.D. NUMBER
60c — HOURLY WAGE
60d — HOURS WORKED FOR PAST MONTH
60e — PAY DUE

*FIG. 2a*

62
62a — ABE ADAMS
62b — 123
62c — 6.50
62d — 185
62e — 1202.50

64
64a — BARRY BARNES
64b — 234
64c — 11.00
64d — 150
64e — 1650.00

66
66a — CINDY COX
66b — 345
66c — 12.50
66d — 160
66e — 2000.00

68
68a — DIANE DAVIS
68b — 456
68c — 8.00
68d — 170
68e — 1360.00

*FIG. 2b*

| | AREA 1 | | AREA 2 | | AREA 3 |
|---|---|---|---|---|---|
| 1200 | ABE ADAMS | 2200 | BARRY BARNES | 5200 | CINDY COX |
| 1210 | 123 | 2210 | 234 | 5210 | 345 |
| 1214 | 6.50 | 2214 | 11.00 | 5214 | 12.50 |
| 1218 | 185 | 2218 | 150 | 5218 | 160 |
| 121C | 1202.50 | 221C | 1650.00 | 521C | 2000.00 |
| t1 | INPUT | | — | | — |
| t2 | PROCESS | | INPUT | | — |
| t3 | OUTPUT | | PROCESS | | INPUT |
| t4 | INPUT | | OUTPUT | | PROCESS |
| t5 | PROCESS | | INPUT | | OUTPUT |

| ADDRESS TAG | MISC CONTROL INFO | ACCESS TYPE | NEXT POINTER | A CONTROL | POINTER A | B CONTROL | POINTER B | C CONTROL | POINTER C |

| 11 | — | — | 00 | 101 | 1214 | 110 | 2214 | 100 | 5214 |

- 60a — EMPLOYEE NAME
- 60b — I.D. NUMBER
- 60c — HOURLY WAGE
- 60d — HOURS WORKED FOR PAST MONTH
- 60e — PAY DUE
- 60f — WEEKLY HOURS WORKED #1
- 60g — WEEKLY HOURS WORKED #2
- 60h — WEEKLY HOURS WORKED #3
- 60i — WEEKLY HOURS WORKED #4

```
      62               64               66               68
62a ╲            64a ╲            66a ╲            68a ╲
62b ╲ ABE ADAMS  64b ╲ BARRY BARNES 66b ╲ CINDY COX 68b ╲ DIANE DAVIS
62c ╲ 123        64c ╲ 234         66c ╲ 345        68c ╲ 456
62d ╲ 6.50       64d ╲ 11.00       66d ╲ 12.50      68d ╲ 8.00
62e ╲ 185        64d ╲ 150         66d ╲ 160        68d ╲ 170
62e ╲ 1202.50    64e ╲ 1650.00     66e ╲ 2000.00    68e ╲ 1360.00
62f ╱ 40         64f ╱ 35          66f ╱ 46         68f ╱ 50
62g ╱ 50         64g ╱ 35          66g ╱ 34         68g ╱ 40
62h ╱ 50         64h ╱ 40          66h ╱ 42         68h ╱ 37
62i ╱ 45         64i ╱ 40          66i ╱ 38         68i ╱ 43
```

FIG. 6b

| | AREA 1 | | AREA 2 | | AREA 3 |
|---|---|---|---|---|---|
| 1200 | ABE ADAMS | 2200 | BARRY BARNES | 5200 | CINDY COX |
| 1210 | 123 | 2210 | 234 | 5210 | 345 |
| 1214 | 6.50 | 2214 | 11.00 | 5214 | 12.50 |
| 1218 | 185 | 2218 | 150 | 5218 | 160 |
| 121C | 1202.50 | 221C | 1650.00 | 521C | 2000.00 |
| 1221 | 40 | 2221 | 35 | 5221 | 46 |
| 1224 | 50 | 2224 | 35 | 5224 | 34 |
| 1227 | 50 | 2227 | 40 | 5227 | 42 |
| 122A | 45 | 222A | 40 | 522A | 38 |

FIG. 7

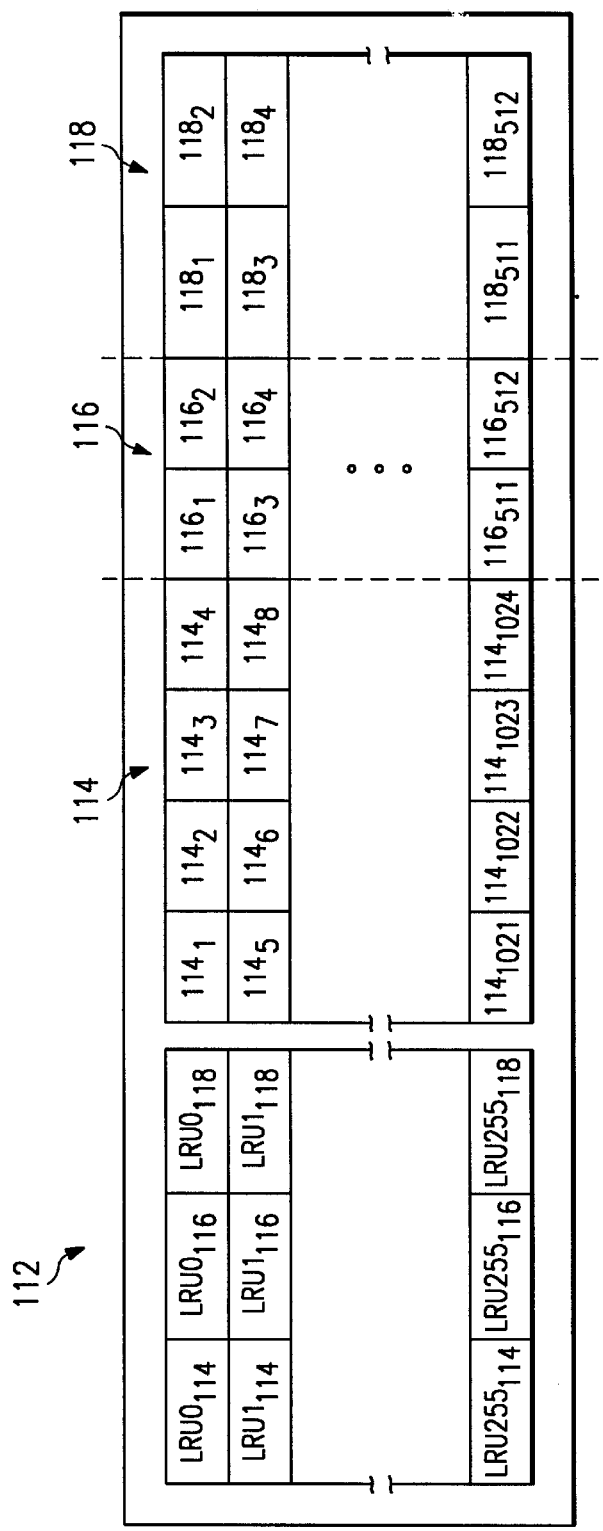
FIG. 14
FIG. 15
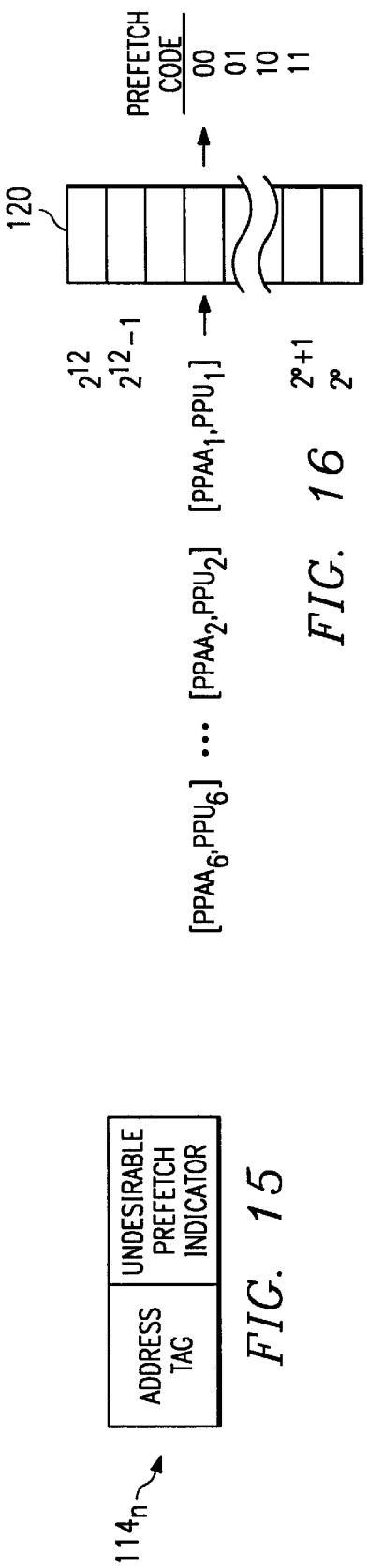
FIG. 16

MICROPROCESSOR CIRCUITS, SYSTEMS, AND METHODS IMPLEMENTING A LOAD TARGET BUFFER WITH ENTRIES RELATING TO PREFETCH DESIRABILITY

This application claims priority under 35 USC 119 (e) (1) of provisional application No. 60/033,958, filed Dec. 31, 1996.

CROSS-REFERENCES TO RELATED APPLICATIONS

Not Applicable.

STATEMENT REGARDING FEDERALLY SPONSORED RESEARCH OR DEVELOPMENT

Not Applicable.

BACKGROUND OF THE INVENTION

The present embodiments relate to microprocessor technology, and are more particularly directed to microprocessor circuits, systems, and methods implementing a load target buffer with entries relating to prefetch desirability.

Microprocessor technology continues to advance at a rapid pace, with consideration given to all aspects of design. Designers constantly strive to increase performance, while maximizing efficiency. With respect to performance, greater overall microprocessor speed is achieved by improving the speed of various related and unrelated microprocessor circuits and operations. For example, one area in which operational efficiency is improved is by providing parallel and out-of-order instruction execution. As another example, operational efficiency also is improved by providing faster and greater access to information, with such information including instructions and/or data. The present embodiments are primarily directed at this access capability and, more particularly, to improving access to data by way of prefetching such data in response to either data load or data store operations.

One very common approach in modern computer systems directed at improving access time to information is to include one or more levels of cache memory within the system. For example, a cache memory may be formed directly on a microprocessor, and/or a microprocessor may have access to an external cache memory. Typically, the lowest level cache (i.e., the first to be accessed) is smaller and faster than the cache or caches above it in the hierarchy, and the number of caches in a given memory hierarchy may vary. In any event, when utilizing the cache hierarchy, when an information address is issued, the address is typically directed to the lowest level cache to see if that cache stores information corresponding to that address, that is, whether there is a "hit" in that cache. If a hit occurs, then the addressed information is retrieved from the cache without having to access a memory higher in the memory hierarchy, where that higher ordered memory is likely slower to access than the hit cache memory. On the other hand, if a cache hit does not occur, then it is said that a cache miss occurs. In response, the next higher ordered memory structure is then presented with the address at issue. If this next higher ordered memory structure is another cache, then once again a hit or miss may occur. If misses occur at each cache, then eventually the process reaches the highest ordered memory structure in the system, at which point the addressed information may be retrieved from that memory.

Given the existence of cache systems, another prior art technique for increasing speed involves the prefetching of information in combination with cache systems. Prefetching involves a speculative retrieval, or preparation to retrieve, information, where the information is retrieved from a higher level memory system, such as an external memory, into a cache under the expectation that the retrieved information may be needed by the microprocessor for an anticipated event at some point after the next successive clock cycle. In this regard, the instance of a load is perhaps more often thought of in connection with retrieval, but note that prefetching may also concern a data store as well. More specifically, a load occurs where a specific data is retrieved so that the retrieved data may be used by the microprocessor. However, a store operation often first retrieves a group of data, where a part of that group will be overwritten. Still further, some store operations, such as a store interrogate, do not actually retrieve data, but prepare some resource external from the microprocessor for an upcoming event which will store information to that resource. Each of these cases, for purposes of this Background and the present embodiments to follow, should be considered a type of prefetch. In any event, in the case of prefetching where data is speculatively retrieved into an on-chip cache, if the anticipated event giving rise to the prefetch actually occurs, the prefetched information is already available in the cache and, therefore, may be fetched from the cache without having to seek it from a higher ordered memory system. In other words, prefetching lowers the risk of a cache miss once an actual fetch is necessary.

Given the above techniques, the present inventors provide within a microprocessor a load target buffer ("LTB") which in certain embodiments predicts the address of the data to be used as the address for a prefetch, and in still further embodiments includes entries of different lengths based on either prefetch desirability, and further in some instances based on data fetch pattern behavior. Thus, below are presented various embodiments which address various prior art considerations and still further aspects as ascertainable by a person skilled in the art.

BRIEF SUMMARY OF THE INVENTION

In one embodiment there is a microprocessor comprising a memory system for outputting data in response to an address, wherein the memory system is further operable to receive a prefetch request having a predicted target data address. The microprocessor further includes a load target circuit, which comprises a first plurality of entries of a first length and a second plurality of entries of a second length. Each of the first plurality of entries comprises a value for corresponding the entry to a corresponding first plurality of data fetching instructions. Further, each of the first plurality of entries further comprises a value for indicating a corresponding predicted target data address. Each of the second plurality of entries also comprises a value for corresponding each of the second plurality of entries to a corresponding second plurality of data fetching instructions. However, each of the second plurality of data fetching instructions is of a type for which it is undesirable to issue a prefetch request. Other circuits, systems, and methods are also disclosed and claimed.

BRIEF DESCRIPTION OF THE SEVERAL VIEWS OF THE DRAWING

FIG. 2a illustrates the format of an example of a record to be processed by data record processing software;

FIG. 2b illustrates an example of data to be used in four records following the format introduced in FIG. 2a;

FIG. 3 illustrates a three memory area configuration storing the first three records from FIG. 2, and whereby successive data records may be handled in an overlapping manner such that, during a single time period, data is input from storage to a first area, while data is processed in a second area, and while the data in a third area is output to storage;

FIG. 4 illustrates a first embodiment of an entry in a load target buffer ("LTB") to accommodate a looping data pattern;

FIG. 5 illustrates the LTB entry of FIG. 4 with certain values completed so as to illustrate looping between three successive addresses of 1200, 2200, and 5200;

FIG. 6a illustrates the format of a record from FIG. 2a with still additional fields added thereto;

FIG. 6b illustrates an example of data to be used in four records following the format introduced in FIG. 6a;

FIG. 7 illustrates the three memory area configuration of FIG. 3, above, but further including the additional data introduced in FIG. 6b;

FIG. 14 illustrates an LTB having an eight-way set associate structure, where a first group of entries in each set are a first size and accommodate corresponding data fetching instructions for which it is undesirable to issue a prefetch request, where a second group of entries in each set are a second size larger than the first size, and where a third group of entries in each set are a third size larger than the second size;

FIG. 15 illustrates an entry in an LTB to accommodate a data fetching instruction for which it is undesirable to issue a prefetch request; and FIG. 16 illustrates a programmable table for receiving the PPAA and PPU values and outputting a prefetch code based on those two values.

DETAILED DESCRIPTION OF THE INVENTION

Figure 1:
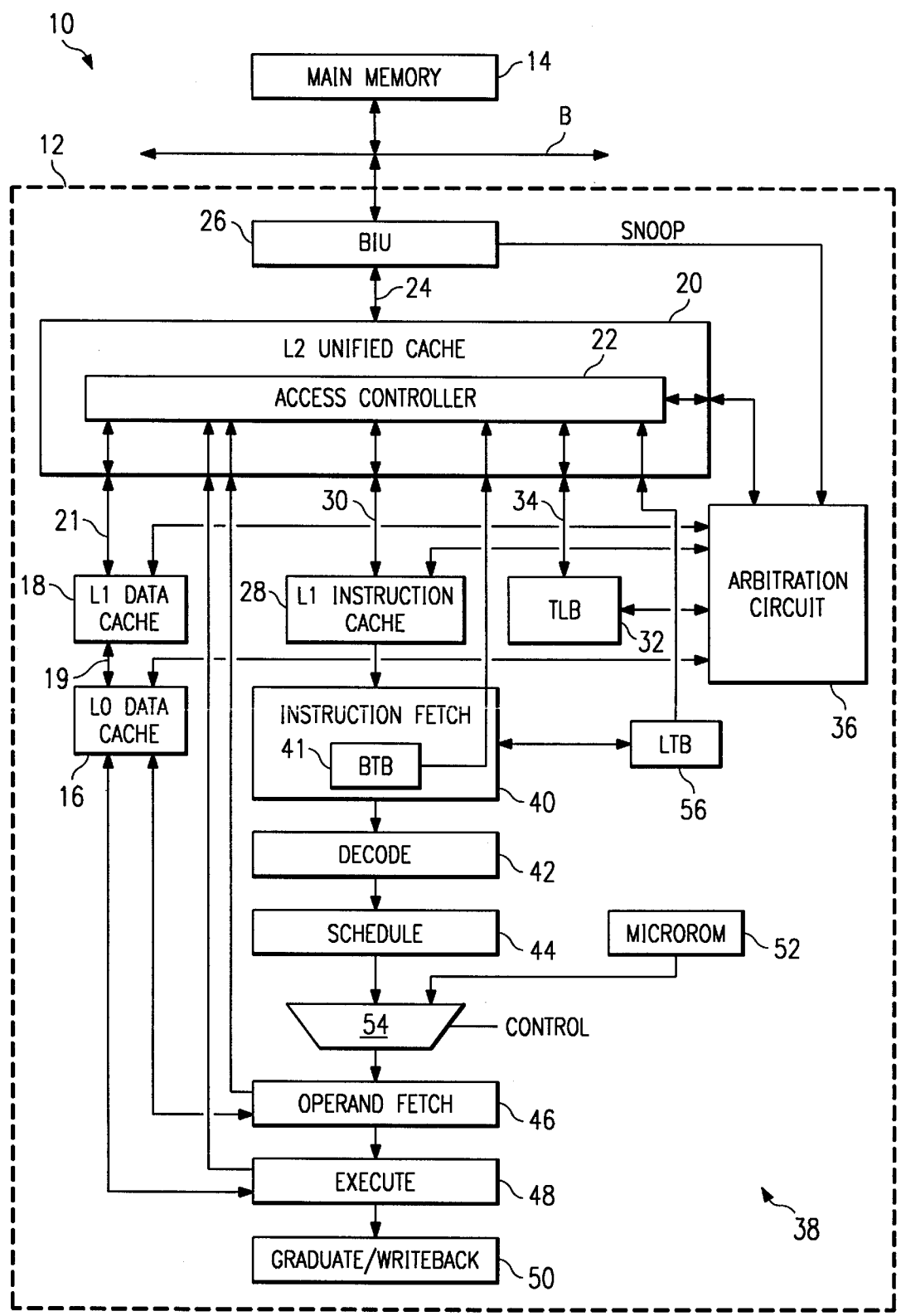
FIG. 1 illustrates an electrical diagram of a microprocessor having a multiple level memory system with various components for both fetching and prefetching information from that system.

FIG. 1 illustrates a block diagram of a microprocessor based system designated generally at 10 and in accordance with the present embodiments. System 10 includes a microprocessor 12 which has a bus B. As demonstrated below in connection with FIG. 12, bus B may connect to various external devices. However, for purposes of providing a context for the present embodiments, only an external memory 14 is shown connected to bus B, with additional items discussed later. Note also that microprocessor 12 may represent various different types of microprocessor structures, and numerous such structures are either known to or ascertainable by one skilled in the art. At this point, however, the details related to such a microprocessor other than in connection with the components of FIG. 1 are neither shown nor explained in order to simplify the present discussion.

Turning to the blocks shown in FIG. 1, microprocessor 12 includes a memory hierarchy in a manner known in the art, that is, a hierarchy which reads and writes data starting from a lowest ordered storage system toward higher ordered storage systems. At the lowest level of such a system is a zero level data cache circuit, shown in FIG. 1 as L0 data cache 16. The "L0" indication demonstrates the matter of memory hierarchy as is known in the art. Specifically, cache circuits with a lower numerical designation are commonly closer to the execution unit of the microprocessor pipeline (described below) as compared to cache circuits with a higher numerical designation, such as the L1 and L2 data cache circuits discussed later. Moreover, the numerical designation of the cache provides an ascending indication of the order in which the caches are typically accessed when either reading from, or writing to, the caches. Thus, such an access first occurs to an L0 cache and, if a cache miss occurs to that cache, it is followed by an access to an L1 cache, and so forth through the memory hierarchy until a hit is found in either a cache or other memory structure. Retuning to L0 data cache 16, in the present embodiment it is preferably a 4-way set associative cache operable to store a total of 1 Kbytes of data in 16 byte blocks, and with each way operable to output 64 bits (i.e., 8 bytes) at a time.

Microprocessor 12 further includes an L1 data cache 18, and which is connected to L0 data cache 16 via a bus 19. Again, the "L1" designation necessarily indicates that this cache is higher in the memory hierarchy as compared to L0 data cache 16. In the preferred embodiment, L1 data cache 18 is preferably a 2-way set associative cache operable to store a total of 8 Kbytes of data in 32 byte blocks, and with each way operable to output 128 bits (i.e., 16 bytes) at a time.

System 10 further includes an L2 unified cache 20, and which is connected to L1 data cache 18 via a bus 21. In the preferred embodiment, L2 unified cache 20 is preferably a 4-way set associative cache operable to store a total of 64 Kbytes of data in 64 byte blocks with 32 byte sub-blocks, and with each way operable to output 256 bits (i.e., 32 bytes) at a time. Note that the L2 cache is referred to as a unified cache, meaning in addition to storing data it stores other information as well. Specifically, as shown below, L2 unified cache 20 further stores instructions as well as address translation information. Note that in an alternative embodiment, however, the type or types of information stored may vary. In any event, with respect to data note then the memory hierarchy formed, that is, from L0 data cache 16, to L1 data cache 18, to L2 unified cache 20. Therefore, a first source giving rise to a potential addressing of L2 unified cache 20 is L1 data cache 18 in response to a miss in L1 data cache 18, which in turn arose from a miss in L0 data cache 16. Moreover, in each fetch instance causing a cache miss, data is sought at the next higher level of this hierarchy; thus, if a miss occurs at L2 unified cache 20, then the data is addressed from external memory 14. Note also that L2 unified cache 20 further includes an access controller 22. As detailed below, access controller 22 receives requests to access L2 unified cache 20, where those requests may be either for fetching or prefetching information from L2 unified cache 20.

Before discussing the other information paths shown in FIG. 1 relating to L2 unified cache 20, and completing the illustration of FIG. 1 in an upward sense toward bus B, note that L2 unified cache 20 is further connected by way of a bus 24 to a bus interface unit ("BIU") 26, and BIU 26 is connected to bus B. As suggested above, bus B permits external access from microprocessor 12 and, therefore, may control and perform communication between microprocessor 12 and other elements external from the microprocessor, including external memory 14 which one skilled in the art will appreciate is higher in the memory hierarchy than L2 unified cache 20 (and, of course, also higher than L1 data cache 18 and L0 data cache 16 as well). As another example, note that an external cache may be connected between bus B and main memory 14 and, thus, microprocessor 12 could communicate with such an external cache. As still another example, note that microprocessor 12 may communicate with other microprocessors in a multiple microprocessor system, such as communicating with the on-chip memory or memories of those other microprocessors. In any event, these external devices are by way of example and, at this point, any additional elements external from microprocessor 12 are not detailed for sake of simplicity, with examples of such elements known or ascertainable by one skilled in the art.

As mentioned above, L2 unified cache 20 also stores instructions. In this regard, a second source giving rise to a potential addressing of L2 unified cache 20 is L1 instruction cache 28. Specifically, L1 instruction cache 28 is connected via a bus 30 to L2 unified cache 20. As its name implies, L1 instruction cache 28 stores instructions (as opposed to data as is stored in L1 data cache 18). In the preferred embodiment, L1 instruction cache 28 is constructed and sized in the same manner as L1 data cache 18 and, therefore, is preferably a 2-way set associative cache operable to store a total of 8 Kbytes of information; here, the information is instructions in 32 byte blocks, and each way is operable to output 128 instruction bits (i.e., 16 bytes) at a time.

A third source giving rise to a potential addressing of L2 unified cache 20 is a translation lookaside buffer ("TLB") 32. Specifically, TLB 32 is connected via a bus 34 to L2 unified cache 20. In the preferred embodiment, as is common in the microprocessor art, logical instruction addresses are translated to corresponding physical addresses. In this context, TLB 32 stores a table of some of the existing translations so that such translations may be accessed at subsequent times without having to re-calculate the translation. In addition, if there is a miss in the look up to TLB 32, then hardware associated with TLB 32 begins a table walk through page tables in main memory to determine the address translation. These main memory page table also may be stored, in part or whole, in L2 unified cache 20. In the preferred embodiment, TLB 32 is preferably 256 entries, 4-way set associative, and sized such that each line stores a single translation.

Having noted the different levels of caches in FIG. 1, note further that each such cache is also connected to an arbitration circuit 36. Arbitration circuit 36 is included to demonstrate the general functionality of successive accesses to each cache based on a miss of a lower cache. For example, as mentioned above, if a cache access to L0 data cache 16 results in a cache miss, then L1 data cache 18 is accessed, followed by L2 unified cache 20, and so forth. Arbitration circuit 36, therefore, represents an arbitration control over this functionality, and may be implemented in various fashions by a person skilled in the art. Note that arbitration circuit 36 also connects to access controller 22 of L2 unified cache 20. Thus, when an access request is to be presented to L2 unified cache 20 based on a miss of a lower-level cache, then arbitration circuit 36 presents this access request to access controller 22. As detailed below, however, access controller 22 also represents an additional level of control which may prioritize these requests and re-issue them to L2 unified cache 20 based on the priority.

A fourth source giving rise to a potential addressing of L2 unified cache 20 is any circuit providing a snoop request to L2 unified cache 20. As is known in the art, snooping is a function which ensures memory coherency through different levels in a memory hierarchy. The snoop request may be generated either internally or externally from the microprocessor. Typically, a snoop occurs by presenting an address to one or more levels of the memory system. In FIG. 1, this functionality is shown by way of a snoop address input from BIU 26 to arbitration circuit 36 which, in turn, may present the snoop address to any of the cache structures of FIG. 1. Each cache may be directed to respond in various manners to the snoop address depending on factors known in the art such as the coherency protocol being implemented. For example, the cache may be directed to merely confirm whether it stores information corresponding to the snoop address. As another example, the cache may be directed to output the information corresponding to the snoop address if it has such information. As yet another example, the cache may be directed to invalidate the information corresponding to the snoop address if it has such information. In any event, the snoop address poses yet another potential address to L2 unified cache 20.

Having presented the various components of the addressable memory hierarchy of microprocessor 12, reference is now turned to the components of the microprocessor which may require the addressable information from the memory hierarchy. In this regard, microprocessor 12 includes a pipeline designated generally at 38 and which may used to receive and process instructions in a complex instruction set computer ("CISC"). Pipeline 38 is shown by way of example as having six stages evenly numbered 40 through 50. Each of stages 40 through 50 is in some respects representative of a stage or stages known in the art, and may differ in name and/or function in different architectures. Thus, the following discussion is by way of example and without limitation to the inventive embodiments. Turning to pipeline 38, note generally that an instruction is retrieved at a beginning stage which in the present example is an instruction fetch stage 40. Instruction fetch stage 40 includes a branch target buffer ("BTB") 41 which may assist in instruction fetching in the context of branch instructions as known in the art. Instruction fetching by stage 40 occurs at a first level from L1 instruction cache 28 described above. Note also that some instruction fetches may stall the pipeline more than one clock cycle, particularly to access slower components of the memory hierarchy system. Typically, the received instruction is thereafter decoded in one or more decoding stages 42. While a pipeline may therefore include an integer number of decode stages, pipeline 38 includes only one such decode stage 42 by way of example, with it understood that typically the decode process is a multi-stage (i.e., multiple clock) process. The decode stage 42 (or stages) decompresses the more complicated instruction into one or more simple operations referred to in this document as micro-operation codes. These micro-operation codes typically may be executed in a single execution clock. Note also that micro-operation codes have different names depending on the architecture and/or manufacturer. For example, in the Texas Instruments' standard, micro-operation codes are referred to as atomic operations ("AOps"). These AOps, if completed in their entirety, represent completion and graduation of the instruction set instruction, including its opcode and operands if applicable. Note that AOps are approximately comparable to some RISC instructions and, thus, are the codes which are connected to various portions of the microprocessor to subsequently initiate execution of the decoded instruction. Thus, AOps are comparable to what is referred to in other architectures as ROps, µOps, or RISC86 instructions.

After the micro-operation codes are generated from decode stage 42, schedule stage 44 schedules those codes to the corresponding appropriate execution units of the microprocessor. In some conventions, the scheduling stage is referred to as the issuing of each micro-operation code to its execution unit. For example, if a microprocessor includes three execution units (e.g., an arithmetic unit, a load/store unit, and a floating point unit), then a group of up to three micro-operation codes may be formed and assigned for execution in a single clock cycle by each corresponding execution unit. Indeed, a microprocessor may include more than three execution units, such as by having more than one arithmetic unit and more than one load/store unit. In such an event, the number of micro-operation codes to be executed in a single clock cycle may be increased accordingly. For purposes of a referring term to use in this document, the group of micro-operation codes, regardless of its size, is referred to as a "machine word." It is not uncommon for such a machine word to require 50 or more bits per execution resource and, therefore, a microprocessor with three execution units may operate in response to a machine word on the order of 150 bits in width.

Before discussing the stage following schedule stage 44, note further that machine words may come from a different source as an alternative to that described above, namely, from a microprogram memory 52 which often is referred to in the art as a microROM. Microprogram memory 52 is commonly a read only memory which is pre-programmed with various threads of machine words. The output of microprogram memory 52 is connected as an input to a multiplexer 54 as is the output of schedule stage 44. Consequently, multiplexer 54 may, in response to various control signals which need not be detailed here, provide a machine word from microprogram memory 52 to the next successive stage rather than a machine word from schedule stage 44. More specifically, an entry point address may be generated to microprogram memory 52 in which case the first machine word in such a thread is output, and then during each successive clock cycle a successive machine word in the thread may be output. Thus, by repeating this process, one of the entire threads from microprogram memory 52 is passed to the remainder of pipeline 38, which may then execute and complete each of the machine words in the microprogram memory thread.

After multiplexer 54, operand fetch stage 46 fetches any data necessary to execute any one or more of the micro-operation codes in the currently issued machine word. Typically, this data includes operands fetched from either registers or memory. In the context of retrieving data from memory, note that stage 46 is connected to L0 data cache 16 to seek data from that cache. Again, if a miss occurs at that cache level, one skilled in the art will therefore appreciate that the data may then be sought from a higher level, such as L1 data cache 18, L2 unified cache 20, or external memory 14. Note that like instruction fetches, some data fetches also may stall the pipeline more than one clock cycle.

Execution stage 48 includes numerous execution units, such as one or more arithmetic logic units, one or more load/store units, and a floating point unit. For each such unit, the unit executes its corresponding part of the machine word, that is, each execution unit performs its corresponding function on its assigned micro-operation code. Note also that one or more execution units of execution stage 48 also may access data and, therefore, stage 48 is also connected to L0 data cache 16 and, by that connection, has access to that cache as well as to the additional data storage structures higher than that cache in the memory hierarchy of microprocessor 12.

Lastly, stage 50 graduates the instruction, meaning it is allowed to complete and take its effect, if any, on the architected state of the microprocessor. In addition, the result of the instruction, if any, may be written to some store such as a register file. This last operation is commonly referred to as writeback, and sometimes is considered a function which is not part of the final pipeline stage, but which occurs at the same time the instruction is graduated.

Given the discussion presented thus far, one skilled in the art will appreciate that microprocessor 12 includes various circuits which may access information from its memory hierarchy, where that information may be either data, instructions, or address translation tables. Note that the accesses described to this point deal with actual fetches of such information, that is, the retrieval of information where that information is fetched directly into pipeline 38. Typically, the fetched information is then acted upon in the clock cycle immediately following the cycle in which it was fetched. For example, an instruction fetched in a first clock cycle by instruction fetch stage 40 may be decoded by decode stage 42 in the next clock cycle following the first clock cycle. As another example, data fetched in a first clock cycle by data fetch stage 46 may be used by an execution unit in execution stage 48 in the next clock cycle following the first dock cycle. Lastly, note that the types of accesses described above are only by way of illustration, and still others will be ascertainable by one skilled in the art. For example, certain instructions may access the memory hierarchy to fetch information into the pipeline when the instruction is at any of various different stages of the pipeline. Moreover, the discussion of pipeline 38 above is merely by way of example, and instructions therefore may fetch information into the pipeline when passing through various pipeline stages of other types of pipeline architectures (e.g., reduced instruction set computer) as known in the art.

Having discussed accessing information by fetching, note that system 10 further includes various circuits and methodology pertaining to information accesses which involve prefetching rather than fetching. Prefetching differs from fetching in that prefetched information is retrieved speculatively rather than being retrieved because of an actual need to act upon the information as soon as it is received. In the present embodiments, prefetching is used to reduce effective access time through the memory hierarchy of system 10 as detailed below. Moreover, as introduced in the above Background, prefetching may involve an instance such as a load, a data store, or a store interrogate. In any event, at this point some introductory discussion is presented to facilitate an understanding of the embodiments below. Recall that information stored in external memory 14 also may be stored in various caches, with the different caches characterized in part by their location in the memory hierarchy as well as the type of information stored by a given cache. In the instance of prefetching, when a prefetch is desired by one of various circuits within microprocessor 12 (those circuits being discussed below), the requesting circuit issues a prefetch request corresponding to the desired information. Preferably, and as detailed below, the prefetch request includes at least the address of the desired information as well as some indication of the size (e.g., number of bytes) of the desired information. In the preferred embodiment, note that the prefetch request is coupled directly to L2 unified cache 20 as opposed to a lower level cache structure. In other words, unlike a fetch request, the prefetch request does not access the lowest level(s) of cache which may store the particular type of information being sought by the request. Note that this approach arises because, in the preferred embodiment, L2 unified cache 20 is downward inclusive in its information, meaning that any information in a cache lower in order than L2 unified cache 20 is also stored in L2 unified cache 20. For example, if L1 data cache 18 stores a cache line of information, that same information is also stored in L2 unified cache 20. Consequently, if a prefetch operation is issued to L2 unified cache 20 resulting in a cache miss, then it is also known that none of the lower caches store the requested information as well and, therefore, it is beneficial to continue with the prefetch operation to bring the information on chip to L2 unified cache 20. Once the information is then brought on chip, if it is thereafter needed it is more readily accessible (i.e., at least in L2 unified cache 20) so an external access is not necessary. In this regard, note therefore that most of the benefit of prefetching is achieved by bringing the prefetched data on-chip. In other words, without the prefetch, if a fetch for that information is later issued and must retrieve the information off chip, then numerous clock cycles are likely required for this access. However, by prefetching the information on-chip, then it will be available from at least one of the on-chip caches and, therefore, the time to access that information is considerably shorter than would be required from an off-chip access. Moreover, if a prefetch operation is issued to L2 unified cache 20 resulting in a cache hit, then it is known that the information is then available from L2 unified cache 20, and may even be available from a cache lower in the hierarchy as compared to L2 unified cache 20. In either location, therefore, the information is accessible in a relatively short time period as compared with having to retrieve it from an off chip resource. Additional benefits of this preferred action are described below. In any event, note that once the prefetch request is presented to L2 unified cache 20, without additional intervention it generally may be confirmed that L2 unified cache 20 either stores that information, or that information may be retrieved into L2 unified cache 20 from a higher level memory. Alternatively, the prefetched information may be stored in some other resource within microprocessor 12, such as within a group of prefetch buffers, where those buffers are either a part of L2 unified cache 20 or are a separate structure. In any event, once the information is prefetched, and if the speculative prefetch is correct, that is, if the information is thereafter needed for an actual fetch, then it is accessible from a cache (i.e., L2 unified cache 20) or other on-chip resource and, therefore, effective access time to the information is minimized.

Given the above discussion of prefetching, note further that it raises two considerations addressed by the present embodiments below. First, there is the consideration of which circuits may issue a prefetch. Second, it is stated above that the access of prefetch information proceeds with respect to L2 unified cache 20 in the above manner in the absence of additional intervention; however, as demonstrated below, the present embodiments provide circuits and methodology which in some instances intervene in the prefetch function, as further detailed below.

As introduced above, various circuits may issue a prefetch request in the preferred embodiment. In this regard, note first that some of the above circuits which may issue an actual fetch also may issue a prefetch request. For example, execution stage 48 may issue a prefetch request for data, such as by operation of its one or more load/store units. As another example, while BTBs are known in the art to issue actual fetches for instructions (i.e., for placement into the pipeline for immediate decoding or the like), under the present embodiment BTB 41 of instruction fetch stage 40 also may issue a prefetch request so that one or more instructions are prefetched into L2 unified cache 20. Indeed, in this regard, the reader is referred to U.S. Patent application Ser. No. 08/994,596, entitled "Combined Branch Prediction And Cache Prefetch In A Microprocessor" (Attorney Docket Number TI-24154), assigned to the same Assignee as the current patent, filed on Dec. 19, 1997, and which is hereby incorporated herein by reference. Microprocessor 12 includes additional circuits which also may issue a prefetch request. Specifically, note now that microprocessor 12 further includes a load target buffer ("LTB") 56 connected to L2 unified cache 20 (although in alternative embodiments the prefetch request it issues could be connected elsewhere, such as to a lower level cache(s)). At this point and by way of introduction, note that LTB 56 includes addresses of certain data fetching instructions and predictions based on which data will be used by those instructions in the future by microprocessor 12. Thus, once the data fetching instruction is itself fetched into pipeline 38, LTB 56 may be consulted to determine if it has an entry corresponding to the data fetching instruction. If so, and based on the prediction and possibly other information corresponding to the data fetching instruction, LTB 56 may then issue a prefetch request to L2 unified cache 20. Without other intervention, the prefetch request is responded to by a prefetch operation starting from L2 unified cache 20 and propagating upward through the memory hierarchy so that the data is confirmed to be currently on-chip (i.e., within one of its caches) or so it may be retrieved onto the microprocessor in response to the prefetch request. Thus, once retrieved, the data is available for subsequent use once the data fetching instruction requires the data as the instruction passes through pipeline 38. Note also that it is stated shortly above that the prefetch operation occurs in response to the prefetch request if there is no other intervention. In this regard, however, note that in some instances the prefetch operation in response to the request may be suppressed, or modified, based on other system parameters. For more information on such a system, the reader is referred to U.S. Patent application Ser. No. 08/999,091, entitled "Circuits, Systems, And Methods For Prefetch Handling In A Microprocessor-Based System" (Attorney Docket Number TI-24153), assigned to the same Assignee as the current patent, filed on the same date as the current patent, and which is hereby incorporated herein by reference.

Looking now more closely to LTB 56, note that it predicts the address of the data to be fetched by a data fetching instruction, and for purposes of discussion this data will be referred to as target data and its address will be referred to as a target data address. In response to the prediction of LTB 56, the target data at the target data address may be prefetched into a cache (e.g., L2 unified cache 20) or other memory structure on the microprocessor chip before the data fetching instruction is executed. Hence, once the data fetching instruction thereafter requires the data, the data may be fetched from the on-chip cache or memory structure rather than having to fetch the data from some external storage device. In other words, prefetching in this manner reduces the cost of a cache miss and, therefore, improve microprocessor efficiency. Given the benefit of prefetching, however, this benefit is only realized if the LTB is able to accurately predict the data pattern for a given data fetching instruction. As detailed below, the present embodiments improve upon the prior art by providing accurate prediction for various complicated data patterns.

At least a current publication discusses predicting simple load targets directed to software in the science arena and, therefore, is directed to data structures which are often encountered in such software. In contrast, the present inventors have recognized that data record processing software for business often involves considerably different types of data structures as opposed to science and technical software. Therefore, current LTBs are not well-suited for such different data structures. Consequently, the present inventors present in this document various embodiments which permit prefetching of target data which is particularly beneficial for data record processing software. By data record processing software, it is intended to designate programs which are record intensive, where often loops of instructions are repeated for each record in a file of records. To further introduce this concept, FIG. 2a illustrates a simple record designated generally at 60, and which includes five fields 60a through 60e by way of example. Of course, a lesser or greater number of fields may be used, and the subject matter of those fields may vary immensely. The examples of FIG. 2a provide a common context for purposes of later discussion. Thus, turning to record 60, its first field 60a identifies an EMPLOYEE NAME, while the remaining fields specify attributes of that employee. Specifically, the second field 60b identifies the employee's I.D. NUMBER, the third field 60c identifies the employee's HOURLY WAGE, the fourth field 60d identifies the number of employee's HOURS WORKED FOR THE PAST MONTH (hereafter abbreviated as "HOURS WORKED"), and the fifth field 60e identifies the PAY DUE to the employee based on fields 60c and 60d as better appreciated below.

To further present a background for discussion below, FIG. 2b illustrates four records 62, 64, 66, and 68, which follow the format of record 60 in FIG. 2a. However, specific information is provided for each of records 62, 64, 66, and 68, again to provide examples for purposes of discussion below. For example, record 62 lists the EMPLOYEE NAME as Abe Adams, his I.D. NUMBER as 123, his HOURLY wage as $6.50, his number of HOURS WORKED equal to 185, and his pay due equal to $1202.50. One skilled in the art will further appreciate how this data is also provided for each of records 64, 66, and 68 as well without re-stating the data of each field herein. Note also that the actual information fields shown in records 62, 64, 66, and 68 are merely fictitiously created data and, therefore, are not intended to reflect upon any individual, living or dead.

Given that the present embodiments relate to LTB technology, note that the use of LTB 56 improves microprocessor efficiency in instances where the predictions of LTB 56 are accurate a sufficient number of times. In this regard, and having introduced record formats, the present inventors have appreciated how LTB 56 may be constructed so its predictions are sufficiently acceptable in the context of certain known techniques for processing data records. FIG. 3 introduces one such technique. Specifically, one technique commonly used by data record processing software involves the use of three separate memory areas to allow the handling of three different data records to overlap; to illustrate his process, FIG. 3 illustrates three such memory areas designated AREA 1, AREA 2, and AREA 3. Typically, the AREAs used in the manner described in connection with FIG. 3 are separate pages in memory, but other techniques for dedicating memory areas may be used. In any event, the location of each of three AREAs will be known to the software by the beginning address of each such AREA. To present an example for discussion, assume that AREA 1 commences at address 1200 in memory, AREA 2 commences at address 2200 in memory, and AREA 3 commences at address 5200 in memory. For purposes of example, the addresses of the various AREAs are hexadecimal numbers as appreciated by one skilled in the art.

Once the locations of the AREAs of FIG. 3 are known, each AREA is used as a temporary workspace for one of the records of the file of records as explained immediately below. Using the records of FIG. 2b by way of example, each memory AREA is used for a successive record. Moreover, the use of the AREAs in this manner overlaps as follows. At a first time, shown as t1 in FIG. 3, a data record is fetched into AREA 1, starting at the beginning address of AREA 1 which is 1200. In the present example, therefore, record 62 from FIG. 2b is fetched into AREA 1. Note that the fifth field (i.e., PAY DUE) is shown in FIG. 3, but its value is initially not in the record but instead is later calculated and written to the memory as is discussed later. Note also that the input of record 62 in this manner is typically performed without burdening the central processing unit ("CPU"), such as by using a separate direct memory access controller ("DMA") or the like. Thus, during t1, DMA is used to fetch record 62 from some storage such as disk storage and input to AREA 1, starting at the beginning address of AREA 1 which is 1200. At a second time, shown as t2 in FIG. 3, a data record is fetched into AREA 2, starting at the beginning address of AREA 2 which is 2200. In the present example, therefore, record 64 from FIG. 2b is input via DMA to AREA 2. However, note further during t2 that while record 64 is being input to AREA 2, record 62 in AREA 1 is being processed by the CPU; that is, the fields of record 62 are available to program code for reading any of those fields and writing information to those fields. Thereafter, at a third time, shown as t3 in FIG. 3, a data record is fetched into AREA 3, starting at the beginning address of AREA 3 which is 5200. In the present example, therefore, record 66 from FIG. 2b is input via DMA to AREA 3. However, because both AREAs 1 and 2 already received records, note further during t3 that while record 66 is being input via DMA to AREA 3, record 64 in AREA 2 is being processed and record 62 in AREA 1 is being output More specifically as to record 62 in AREA 1, note that it is output to disk storage also without burdening the CPU, again by using DMA or the like.

Given the format of AREA 1 through AREA 3, but before proceeding with the processing of the records stored in those AREAS, note that the described format of one record per area is by way of example. Thus, as an alternative, note that some input/output to AREAs in this nature is accomplished by blocked records as that term is known in the art. Blocked records indicates an instance where multiple records are placed in a single area, where those multiple records are referred to as a block. For example, in FIG. 3, records 62 and 64 could be stored in AREA 1 while records 66 and 68 were stored in AREA 2. Thus, a different data pattern would be realized, but also may be accommodated by the present embodiments, as further appreciated from the various concepts taught below.

After each of AREAs 1 through 3 has received records in the manner described above, note that the procedure continues as each record in the file of records is to be processed. Thus, at t4, the next record in the file of records is input into AREA 1 so, while not shown in FIG. 3, record 68 of FIG. 2b is input to AREA 1 during t4. Moreover, during this same t4, record 64 is output from AREA 2 while record 66 in AREA 3 is processed. Given this procedure, one skilled in the art will appreciate that successive records may be efficiently processed in memory while reducing access time of those records from and to disk storage. In other words, if only a single memory area were used rather than three memory areas, then a single record would be input to that area, processed, and then output from that area, followed by the next single record, and so forth. This latter procedure would require considerably more time to process a number of records because there is no overlap in the time of inputting one record, while processing another, while outputting still another. In summary, therefore, the technique illustrated by FIG. 3 improves record processing efficiency. Additionally, however, and as demonstrated below, the present inventors also have recognized how the FIG. 3 procedure gives rise to a level of predictability which may be detected and recorded in LTB 56 so that prefetching may be used in combination with the above process to further improved microprocessor efficiency.

To further demonstrate the present embodiments, Table 1 below sets forth a simple pseudo code program to process the records of FIG. 2b:

TABLE 1

| Instruction Address | Pseudo Code |
|---|---|
| 10 | FOR J = 1 TO LAST RECORD |
| 11 | LOAD REG1, HOURLY WAGE |
| 12 | LOAD REG2, HOURS WORKED |
| 13 | LOAD REG3, REG1 * REG2 |
| 14 | STORE REG3, PAY DUE |
| 15 | NEXT J |

Before proceeding with a discussion of the implementation of LTB 56, additional comments are helpful in connection with the pseudo code of Table 1. First, note that as pseudo code it is intended that the code of Table 1 is merely an example and, of course, the actual code used by a microprocessor to accomplish the functions illustrated by the code may differ in form and/or complexity. In any event, the intended illustration of Table 1 is that various lines of program code will be stored somewhere in memory, and the program lines will perform various operations on each record in the record file of FIG. 2b. With respect to memory storage of the program code, note that Table 1 lists a memory address for each of the program lines, starting from address 10 and incrementing by one for each successive instruction. From this point forward, therefore, each such instruction is referred to by its address in Table 1. With respect to the operations performed by the code, the example of Table 1 calculates the amount of money earned by each employee for the past month, that is, it calculates the field PAY DUE shown in FIG. 2a. Specifically, PAY DUE is calculated by multiplying the HOURLY WAGE of each employee times that employee's HOURS WORKED. More particularly, instructions 11 and 12 load each of these multipliers into respective registers, and instruction 13 performs a multiplication of those registers and stores the product in a third register. Lastly, instruction 14 stores the result to the PAY DUE field for the corresponding record. Of course, various additional operations may take place, but the present example should be sufficient to explain further principles set forth below.

The present inventors now demonstrate a looping pattern of operation which has been observed in connection with the memory AREA format of FIG. 3, and which may be predicted by LTB 56 in accordance with the present embodiments. To illustrate this looping technique, the following traces through the pseudo code set forth above through the processing stage of the records of FIG. 2b. Turning to the pseudo code, for J=1, record 62 (i.e., Abe Adams) is processed. Instruction 11 loads the target data of Abe's HOURLY WAGE, which is located at the target data address of 1214. Instruction 12 loads the target data of Abe's HOURS WORKED, which is located at the target data address of 1218. Instruction 13 calculates the product of these two multipliers and stores it to register REG3. Lastly, instruction 14 stores the product realized from instruction 13 into the AREA memory location corresponding to the PAY DUE field, that is, the target data address of 121C. Now, J is incremented by instruction 15 so, for J=2, the same instructions process the data for record 64 (i.e., Barry Barnes). Again, therefore, instruction 11 loads the target data of Barry's HOURLY WAGE, which is located at the target data address of 2214. Instruction 12 loads the target data of Barry's HOURS WORKED, which is located at the target data address of 2218, and thereafter the product is calculated and written to the target data address of 221C. Again, J is incremented so, for J=3, the same instructions process the data for record 66 (ie., Cindy Cox). Again, therefore, instruction 11 loads the target data of Cindy's HOURLY WAGE, which is located at the target data address of 5214. Instruction 12 loads the target data of Cindy's HOURS WORKED, which is located at the target data address of 5218, and thereafter the product is calculated and stored to the target data address of 521C.

Having processed the first three records of the file, recall also that as the record in AREA 3 is being processed by the above instructions, AREA 1 is loaded with the next record. Thus, in the example above, while record 66 for Cindy Cox in AREA 3 is being processed, record 68 for Diane Davis is being fetched into AREA 1. Continuing with the instructions from Table 1, therefore, for J=4, the same instructions process the data for record 68 (i.e., Diane Davis). Again, therefore, instruction 11 loads the target data of Diane's HOURLY WAGE, which is located at the target data address of 1214. Instruction 12 loads the target data of Diane's HOURS WORKED, which is located at the target data address of 1218, and thereafter the product is calculated and stored to the target data address of 121C . Lastly, while no additional records are shown in FIG. 2b, one skilled in the art will appreciate that for each successive record, instructions 10 through 14 repeat for each memory AREA. Therefore, upon processing the data in one memory AREA, the process continues to a next memory area in a looping fashion, that is, from AREA 1, to AREA 2, to AREA 3, and back to AREA 1 again.

Given the above, the present inventors now note their recognition of the predictability of data loads from the above. For example, consider each occurrence of instruction 11. For J=1, instruction 11 required data from target address 1214. For J=2, instruction 11 required data from target address 2214. For J=3, instruction 11 required data from target address 5214. Lastly, for J=4, instruction 11 required data from target address 1214 once more. Thus, given the processing of still additional records, there is a pattern of target addresses, that is, from 1214, to 2214, to 5214, back to 1214, and repeating onward for each record. Thus, for the entirety of records, the present inventors recognize that a loop may be predicted whereby a single instruction (i.e., instruction 11) requires data in a looping fashion, that is, from a first address, to a second address, to a third address, and back to the first address. Further, note that instruction 12 also loops in this manner, but from address 1218, to 2218, to 5218, back to 1218, and repeating onward. Indeed, for various data record processing software programs, it will be noted that this process may occur. Consequently, for a given data fetching instruction, the present embodiments detect such a looping technique. Moreover, the present embodiments then further predict that the data fetching instruction will continue to loop in the detected manner. Lastly, based on the prediction (which is preferably stored in LTB 56), the present embodiments may then prefetch the data which is to be used in this looping manner, thereby minimizing cache misses and improving microprocessor efficiency as demonstrated in detail below.

FIG. 4 illustrates a first embodiment of a single entry $56_1$ set forth in LTB 56 introduced above. Note that in the preferred embodiment, LTB 56 may include on the order of 2048 entries in an Sway set associate structure, but only one entry of one way is shown in FIG. 4 with it understood that the remaining entries in the present embodiment have the same format. Generally, each entry in LTB 56 is operable to store information corresponding to a different data fetching instruction. Thus, up to 2048 different data fetching instructions may be identified in LTB 56 at a time, as better appreciated below. The specific formulation of each entry is detailed later, but a brief introduction of the overall effect of LTB 56 is set forth here. In general, when a data fetching instruction is fetched by instruction fetch stage 40, LTB 56 is searched to determine if it stores an entry corresponding to that data fetching instruction. If not, then an entry is created and updated as detailed below. Once the entry is created, and provided it is set to a valid state, then as mentioned above it provides one or more predictions of the address of the data to be fetched by the data fetching instruction. In other words, suppose that a data fetching instruction is fetched by instruction fetch stage 40 and LTB 56 is found to have a valid entry corresponding to the data fetching instruction. In this instance, while the data fetching instruction is still at the relative top of instruction pipeline 38, the prediction from LTB 56 is used to issue a prefetch request for the data address predicted by the LTB entry. Consequently, in response to this request, the data may be prefetched to a cache or the like on the microprocessor chip. Thereafter, when the data fetching instruction reaches its execution stage, it may fetch the data directly from the cache, without having to access it from a memory external from the microprocessor. Thus, microprocessor efficiency is enhanced, as better appreciated from the following detailed discussion of entry $56_1$.

Turning to entry $56_1$, its first three values are general to the data fetching instruction, with the remaining seven values directed to predictions for prefetching data corresponding to the data fetching instruction. Each of these values is described below.

Starting with the general values of entry $56_1$, its first value is an ADDRESS TAG. The ADDRESS TAG lists the address of where the data fetching instruction is stored in memory. For example, if entry $56_1$ corresponded to the first load instruction in Table 1, then ADDRESS TAG would correspond to a value of 11. The second value of entry $56_1$ includes MISCELLANEOUS CONTROL INFORMATION about the data fetching instruction, where such information may be analogous to information listed in a BTB for a branching instruction. For example, a valid indicator may be stored as part of this value so as to later determine whether the information in the entry is valid and may be relied upon by other circuitry analyzing such information. Other examples will be ascertainable by a person skilled in the art. The third value of entry $56_1$ is the ACCESS TYPE of the data fetching instruction. Various example of access types were earlier introduced. For example, a more straightforward access type is a fetch request, where the data fetching instruction seeks to retrieve (ie., load) information from a certain memory location. As another example, however, the request may be a data store interrogate. In this case, the data store interrogate is a request to prepare some memory structure to receive data, but no data is actually retrieved. Alternatively, the request may be a data fetch store interrogate. Here, like the data store interrogate, the request again seeks to prepare some memory structure to receive data; in addition, however, here a group of data is retrieved into a cache as part of the preparation, with the anticipation that part of that group will be overwritten by a subsequent store to that group. Still other types of requests will be ascertainable by a person skilled in the art.

Looking to the prediction related value of entry $56_1$, the fourth value in entry $56_1$ is a NEXT POINTER which indicates which of three different pointers and its associated control is used as the next prediction of data to be fetched for the corresponding data fetching instruction. More specifically, the remaining six values of entry $56_1$ correspond to three pointers (shown as POINTER A, POINTER B, and POINTER C) as well as control values for each of those pointers (shown as A CONTROL, B CONTROL, and C CONTROL, respectively). Each of the POINTERs is able to store a target data address and, thus, the data at that address represents a prediction of the target data to be prefetched for the instruction associated with entry $56_1$. The CONTROL information is detailed later. At this point, returning to the NEXT POINTER value, and as demonstrated using examples below, its value indicates which of the three pointers and its corresponding CONTROL will predict the next target data address for the data fetching instruction identified in the ADDRESS TAG for entry $56_1$. Thus, the NEXT POINTER is preferably a 2-bit value, where the state of the two bits indicates one of the three POINTERS and its CONTROL as shown in the following Table 2:

TABLE 2

| NEXT POINTER | Identified POINTER |
|---|---|
| 00 | A |
| 01 | B |
| 10 | C |
| 11 | reserved |

Given Table 2, a binary value of NEXT POINTER equal to 00 indicates that the next POINTER to be used as a prediction to the target data address for the given data fetching instruction is POINTER A, as controlled by the CONTROL information corresponding to POINTER A. Similarly, values 01 and 10 correspond to POINTER B and POINTER C, respectively. Lastly, the value of 11 is reserved for use with alternative embodiments.

The CONTROL information for each of the three POINTERs is used to indicate whether a POINTER is valid and, if so, to encode a fetch pattern type for its corresponding POINTER. With respect to fetch pattern types, as demonstrated below the present embodiments may detect different types of data fetching patterns. One of these modes is a loop mode, which corresponds to the example described in connection with the pseudo code of Table 1, above, and which is further explored below. Other modes involve striding patterns, but are detailed later. In any event, the detected pattern is encoded into the CONTROL information. Because only looping has been introduced thus far, Table 3 therefore, sets forth the various indications of the CONTROL information which indicate whether a POINTER is valid and, if so, the type of looping associated with it as embodied in a 3-bit value.

TABLE 3

| CONTROL | INDICATION |
| --- | --- |
| 000 | Pointer is invalid |
| 001 | Reserved |
| 010 | Reserved |
| 011 | Reserved |
| 100 | Loop mode, next pointer = A |
| 101 | Loop mode, next pointer = B |
| 110 | Loop mode, next pointer = C |
| 111 | Reserved |

Given Table 3, a binary value of a CONTROL equal to 000 indicates that the corresponding POINTER value is invalid. On the other hand, if the far left bit of the CONTROL equals 1, then the right two bits of the CONTROL specify the POINTER to which control should loop after fetching from the address specified by the current POINTER, as illustrated by way of example below. Lastly, if the far left bit of the CONTROL equals 0 while one of the two right bits is non-zero, then still additional modes are represented for use with alternative embodiments, as detailed later.

To further illustrate the characteristics of entry $56_1$ as well as the various aspects introduced above, the following discussion now traces through the establishment of the values within entry $56_1$ in connection with the example of Table 1. More particularly, the following discussion applies to instruction 11 of Table 1, but could apply in a similar manner to instruction 12 of Table 1 as well. Recall that the program of Table 1 is stored as instructions in a memory accessible to microprocessor 12, such as in external memory 14. Thus, to process those instructions, each is fetched into pipeline 38 to pass through it toward its execution stage 48. During this process, therefore, instruction 11 is fetched by instruction fetch stage 40 for a first time (i.e. for J=1 of instruction 10). At this point, it is detected, by techniques known in the art, that the instruction is a data fetching instruction, such as a load, a store, a store interrogate, and so forth. In response to detecting that instruction 11 is data fetching instruction, LTB 56 is consulted to determine whether one of its entries corresponds to instruction 11. In the current example, because this is the first time instruction 11 is fetched, LTB 56 will not have an entry corresponding to instruction 11. Thus, an entry is created as described below. Moreover, note also that if an entry were detected in LTB 56, then a control tag also may be appended to instruction 11 so that as it passes through pipeline 38 it is known to be a data fetching instruction which has an entry already established for it in LTB 56.

Creation of an entry in LTB 56 first involves determining where in LTB 56 to create the entry. In this regard, if there are still unused lines in LTB 56, then one of those lines may be selected, either randomly or by some placement algorithm to be used to correspond to instruction 11. On the other hand, if each of the lines in LTB 56 is already established for other data fetching instructions, then least recently used ("LRU") corresponding to each existing entry is checked, and the entry which is the least recently used is evicted (or invalidated) so that the new entry may be formed in its place. Note that use of LRU information to evict entries in a table is known in the art such as in use of caches, as shown in Chapter 5 of the text entitled "Computer Architecture A Quantitative Approach", Second Edition, by Patterson and Hennessy, (1996, Morgan Kaufmann Publishers, Inc.), which is hereby incorporated herein by reference. Regardless of the two techniques and returning to the present inventive embodiment, assume for the current example that an entry is formed for instruction 11 in entry $56_1$. Having chosen entry $56_1$, the value of its address tag is set to correspond to 11, that is, to identify the address where the current data fetching instruction is stored in memory. In addition, the value of the NEXT POINTER is set to 01, that is, to indicate that POINTER B is the next pointer to be consulted upon the next incident of instruction 11, as better appreciated below. Further, because this is the first incident of instruction 11, there is generally insufficient information by which to predict what data the next incident of instruction 11 will require. However, as a default, it is predicted that the current data fetching instruction (i.e., instruction 11) will be part of a loop mode, that is, each incident of the instruction will gather data in a looping fashion as shown by the example of the pseudo code in Table 1, above. Thus, since it is assumed that a loop will be formed from the target address of POINTER A toward the target address of POINTER B, the A CONTROL information corresponding to POINTER A is set to 101, thereby predicting a loop mode where the next target address is pointed to by POINTER B. Beyond this prediction, however, the CONTROL information values corresponding to the remaining POINTERs B and C are set to invalid (i.e., to 000 as shown in Table 3). After establishing entry $56_1$, eventually instruction 11 passes through pipeline 38 and the actual address for the data it requires is ascertainable. At this point, therefore, that address is stored into the value of POINTER A. In the example shown in connection with FIG. 3, recall that the first incident of instruction 11 requires data from address 1214; thus, the address of 1214 is stored into POINTER A.

Continuing with the above example from Table 1, instruction 14 returns control to instruction 10 for the next iteration where J=2. For a second time, therefore, instruction 11 is fetched by instruction fetch stage 40. Again it is detected that instruction 11 is a data fetching instruction and, therefore, LTB 56 is consulted to determine whether one of its entries corresponds to instruction 11. In the current example, because of the previous incident of instruction 11, and assuming no other intervening event has affected the entry, then the ADDRESS TAG of entry $56_1$ is detected as corresponding to instruction 11. In response, the NEXT POINTER of entry $56_1$ is consulted to determine what the predicted target data address is for instruction 11. Recall that the NEXT POINTER indicates POINTER B; thus, the value of POINTER B is examined as a potential target data address. Recall further that the B CONTROL corresponding to POINTER B is currently set to invalid. Thus, at this point, there is no prediction of a target data address for the second incident of instruction 11. In response, first the value of the NEXT POINTER is set to 10, that is, to indicate that POINTER C is the next pointer to be consulted upon the next incident of instruction 11. Moreover, again as a default, it is predicted that the current data fetching instruction (i e., instruction 11) will be part of a loop mode. Thus, since it is assumed that a loop will be formed from the data target address of POINTER B toward the data target address of POINTER C, the B CONTROL is set to 110, thereby predicting a loop mode where the next target address is pointed to by POINTER C. Thereafter, again the process waits for instruction 11 to pass through pipeline 38 until its actual target data address is determined. In the example shown in connection with FIG. 3, recall that the second incident of instruction 11 requires data from address 2214; thus, the address of 2214 is stored into POINTER B. Note after two target data addresses are stored in two POINTERs (e.g., POINTER A and B) as in the example thus far (or as an alternative either at the same time the second address is being stored or before it is being stored), an additional test is performed for reasons more clear below. Specifically, it is determined whether the two target data addresses match. In the current example, however, there is no such match. Thus, the process continues under the assumption of the loop mode as detailed below.

Continuing still further with the above example from Table 1, instruction 14 returns control to instruction 10 for the next iteration where J =3. For a third time, therefore, instruction 11 is fetched by instruction fetch stage 40. Again it is detected that instruction 11 is a data fetching instruction and LTB 56 is consulted to access entry $56_1$ corresponding to instruction 11. In response, the NEXT POINTER value of entry $56_1$ is consulted to determine what the predicted target data address is for instruction 11. The NEXT POINTER indicates POINTER C, so the value of POINTER C is examined as a potential target data address. Recall, however, that the C CONTROL value corresponding to POINTER C is currently set to invalid. Thus, at this point, there is no valid prediction of a target data address for the third incident of instruction 11. In response, first the value of the NEXT POINTER is set to 00, that is, to indicate that POINTER A is the next pointer to be consulted upon the next incident of instruction 11. Once again as a default, it is predicted that the current data fetching instruction 11 is part of a loop mode, thereby looping from the target address of POINTER C toward the target address of POINTER A; thus, the C CONTROL information corresponding to POINTER C is set to 100, thereby predicting a loop mode where the next target address is pointed to by POINTER A. Thereafter, again the process waits for instruction 11 to pass through pipeline 38 until its actual target data address is determined. In the example shown in connection with FIG. 3, recall that the third incident of instruction 11 requires data from address 5214; thus, the address of 5214 is stored into POINTER C. Note also that after three target data addresses are stored in all three POINTERs as in the example thus far (or as an alternative either at the same time the third address is being stored or before it is being stored), an additional test is performed for reasons more dear below. Specifically, it is determined whether the most recent target data address (e.g., the one in POINTER C) matches the least recent target data address (e.g., the one in POINTER A). In the current example, however, there is no such match. Thus, the process as currently described continues under the assumption of the loop mode as detailed below. Note, however, that in an alternative process detailed below, it is also determined whether the most recent target data address (e.g., the one in POINTER C) matches the target data address in POINTER B as well.

To summarize the above Table 1 example as of this point in the discussion, FIG. 5 illustrates entry $56_1$ with the example values listed given the example of instruction 11 having been processed three times. Thus, in summary, note first that the NEXT POINTER to be consulted is POINTER A. Additionally, note that a loop mode is predicted for each POINTER. In other words, POINTER A identifies a first target data address (i.e., 1214), and its corresponding A CONTROL predicts that after the data pointed to by POINTER A is used by instruction 11, its next incident will loop to the target data address of POINTER B. Similarly, POINTER B identifies a second target data address (i.e., 2214), and its corresponding B CONTROL predicts that after the data pointed to by POINTER B is used by instruction 11, its next incident will loop to the target data address of POINTER C. POINTER C identifies a third target data address (ie., 5214), and its corresponding C CONTROL predicts that after the data pointed to by POINTER C is used by instruction 11, its next incident will return to complete the loop back to the target data address of POINTER A.

Given the above, one skilled in the art will appreciate that for each subsequent incident of instruction 11, LTB entry $56_1$ properly predicts the pattern of data fetching for that instruction. For example, continuing with the example for the fourth incident if data fetching instruction 11, instruction 11 is fetched by instruction fetch stage 40 and entry $56_1$ is detected and consulted. The NEXT POINTER value indicates that POINTER A is currently controlling, the A CONTROL indicates a loop mode, and the value of POINTER A predicts that this fourth incident of instruction 11 will require the target data at target data address 1214. At this point, therefore, a prefetch request is issued either by LTB 56 or a circuit associated with it to request a prefetch of the data at target data address 1214. Returning to FIGS. 1b and 2, therefore, this fourth incident will issue a prefetch request to retrieve the HOURLY WAGE for Diane Davis. Thus, as the data fetching instruction 11 passes through pipeline 38, this data may be prefetched into an on-chip cache. Thereafter, when data fetching instruction 11 is executed, it may load the data from the on-chip cache rather than having to alternatively retrieve it from an external memory, where that alternative would be far more time consuming.

The fourth incident of data fetching instruction 11, as well as each subsequent incident of that instruction, is further used to ensure that entry $56_1$ is accurate. For example, during the fourth incident, either before or during the execution of data fetching instruction 11, its actual target data address is determined. In the current example, given the records from FIG. 2b, the actual target data address will be the same as that which was predicted, that is, an address of 1214. As a result, entry $56_1$ remains correct in its prediction and need not be modified. Indeed, one skilled in the art will now appreciate that for each successive incident of data fetching instruction 56, the prediction shown by the values of FIG. 5 are accurate, thereby providing for continuous prefetching of data from memory addresses 1214, 2214, and 5214, for each respective incident of data fetching instruction 11. In each of these instances, therefore, the accuracy of entry $56_1$ will be confirmed and the values therein will not be disturbed.

Having presented an example of successfully establishing entry $56_1$ for a looping pattern including three addresses, recall it was stated above in connection with the second iteration of instruction 11 (i.e., for J=2) that, in connection with establishing POINTER B, a comparison also was made to whether the two target data addresses match and, in the above example, there was no such match. Note now, however, that the present embodiment also may detect a data pattern where the same data address is repeatedly accessed as the target data address for an instruction, and the above-mentioned comparison is one technique to achieve such detection. More specifically, suppose as an alternative example that instruction 11 repeatedly accessed address 1214, rather than looping in the manner as described above. Thus, after the second iteration of instruction 11, both POINTERs A and B are set to 1214 using the technique described above. However, recall that there is also the comparison of POINTERs A and B after POINTER B is established. Since the two match in the current example, however, then an alternative prediction technique predicts that the data fetching instruction is one which repeatedly accesses the same target data address. In response, the NEXT POINTER is maintained at 01, thereby indicating that POINTER B is once again the NEXT POINTER. Consequently, for each successive incident of instruction 11, the NEXT POINTER continuously indicates that POINTER B stores the predicted target data address, thereby presenting a same address loop mode. Therefore, from that point forward and until an error in the prediction is detected, the same address (e.g., 1214) will be used as the target data address for instruction 11. Note also that because POINTER A stored this same target data address, as an alternative the NEXT POINTER could be maintained as indicating POINTER A to also cause each successive incident of the address to predict address 1214 as the target data address. Indeed, still further, because both POINTERs A and B point to the same address, the control could be set to loop between POINTERs A and B which, in effect, also would cause the same address pointed to by both (i.e., 1214) to be the target data address for each successive incident of instruction 11.

In addition to the instance of detecting the same address pattern described above, recall further that it was stated above in connection with the third iteration of instruction 11 (i.e., for J=3) that, in connection with establishing POINTER C, it is determined whether it matches the least recent target data address (e.g., the one in POINTER A) . In the above example, there was no match and therefore the process continued under the assumption of the loop mode. Note now, however, that the present embodiment also may detect a looping data pattern where the loop only includes two addresses as opposed to three which were demonstrated above. More specifically, suppose as an alternative example that instruction 11 repeatedly accessed address 1214 in one incident, then address 2214 in the next incident, and then looped back to address 1214 in the next incident, and so forth in a looping pattern. Thus, after the third iteration of instruction 11, both POINTERs A and B are set to 1214 and 2214, respectively, using the technique described above, but note further that POINTER C would then also be set to 1214. Recall further that there is also the comparison of POINTERs A and C as well as POINTERS B and C after POINTER C is established (although it is not required to compare POINTERs B and C if POINTERs A and C match, because if A equals C then B cannot equal C in the current scenario (because it was already determined that A does not equal B)). Since POINTERs A and C match in the current example, however, then an alternative prediction technique predicts that the data fetching instruction is one which loops from the address in POINTER B back to the address in POINTER A (i.e., because POINTER C and A identify the same target data address). In response, the NEXT POINTER is set to 01, thereby indicating that POINTER B is once again the NEXT POINTER. In addition, the A CONTROL is set to 101 to indicate a loop mode with the next POINTER to be POINTER B, while the B CONTROL is set to 100 to indicate a loop mode with the next POINTER to be POINTER A. Thereafter, for each incident of the data fetching instruction the NEXT POINTER may be toggled between POINTER A and B so that the loop will continue between the two respective addresses indicated by those two POINTERs.

The above discussion demonstrates an example where the fourth incident of data fetching instruction 11, as well as each subsequent incident of that instruction, gives rise to an accurate prediction of entry $56_1$. However, in other instances, it may be that the data fetching instruction at issue appeared to be looping among three target data addresses, yet an additional incident of the data fetching instruction produces an actual target data address which departs from the predicted loop pattern. In this event, entry $56_1$ is modified in some manner. One example of such a modification is described below in connection with an embodiment which provides for striding before looping. Still other modifications, however, may be ascertainable by a person skilled in the art, and may be implemented into the format of the various values provided by the embodiment of FIG. 4.

Given the implementation of a loop mode by the embodiment of LTB 56 as described thus far, note further that an additional embodiment may be accomplished by extending the format of each entry of LTB 56 as demonstrated below, where that embodiment not only predicts looping as in the case described above, but further predicts strides after a target data address but before looping to a next target data address. As an introduction to this additional embodiment, FIG. 6a once again illustrates record 60 of FIG. 2a, but adds an additional four fields to that record and designated 60f through 60i. As shown in FIG. 6a, each of these fields identifies the number of WEEKLY HOURS WORKED for a first through fourth week of the current month. Thus, these fields, when summed, provide the HOURS WORKED FOR PAST MONTH shown in field 62d. Of course, the present example assumes that the given month only includes four weeks, with this assumption made merely to simplify the example while presenting a basis for further discussion of the present embodiments. In any event, given the four week assumption, and although not discussed earlier, note that the value in field 60d may be written by a program which adds fields 60f through 60i, and stores the result to field 60d.

To further illustrate the concept of FIG. 6a, FIG. 6b illustrates records 62, 64, 66, and 68 of FIG. 2b, but adds to those records the new fields introduced by FIG. 6a. For example, in record 62 corresponding to Abe Adams, fields 62f through 62i identify that Abe worked 40 hours in a first week of the past month, 50 hours in a second week of the past month, 50 hours in a third week of the past month, and 45 hours in a second week of the past month. One skilled in the art will further appreciate how this data is also provided for each of records 64, 66, and 68 as well without re-stating the data of each field herein.

Given the illustrations of FIGS. 6a and 6b, Table 4 below provides a simple pseudo code program to process the records of FIG. 6b, where the program will provide the value to each record of the HOURS WORKED FOR THE PAST MONTH based by determining the sum of each WEEKLY HOURS WORKED field:

TABLE 4

| Instruction Address | Pseudo Code |
| --- | --- |
| 20 | FOR J = 1 TO LAST RECORD |
| 21 | CLEAR REG2 |
| 22 | FOR K = 1 TO 4 |
| 23 | LOAD REG1, WEEKLY HOURS WORKED [#K] |
| 24 | ADD REG2, REG1 |
| 25 | NEXT K |
| 26 | STORE REG2, HOURS WORKED FOR PAST MONTH |
| 27 | LOAD REG1, HOURLY WAGE |
| 28 | MULTIPLY REG2, REG1 |
| 29 | STORE REG2, PAY DUE |
| 27 | NEXT J |

Before proceeding with a discussion of the additional LTB 56 embodiment, note again that Table 4 represents pseudo code and, therefore, the actual code used by a microprocessor to accomplish the functions illustrated by the code may differ in form and/or complexity. In any event, once again the various lines of program code in Table 4 will be stored somewhere in memory, and the program lines will perform various operations on each record in the record file of FIG. 6b. With respect to memory storage of the program code, Table 4, like Table 1 above, lists a memory address for each of the program lines. For the example of Table 4, the memory addresses storing the program code start from address 20 and increment for each successive instruction. From this point forward, each such instruction is referred to by its address in Table 4. With respect to operations performed by the code, instructions 22 through 26 of the example of Table 4 calculate the HOURS WORKED FOR THE PAST MONTH by each employee by summing for each employee the WEEKLY HOURS WORKED for each of the four weeks listed in the employee's record. More particularly, after instruction 21 clears register REG2 (i.e., sets it to zero), then for four iterations instruction 23 loads a successive one of the four values of the WEEKLY HOURS WORKED into register REG1. For each of those instruction 23 loads, instruction 24 adds the contents of registers REG1 and REG2 and stores the result to register REG2. Thus, one skilled in the art will appreciate instruction 24 accumulates into register REG2 a sum of each of the values loaded by instruction 23 for a given employee record. Once the sum is complete for all four weekly fields, instruction 26 stores the total back to the record, at the location corresponding to the field designated HOURS WORKED FOR PAST MONTH. Once again, various additional operations may take place, as is further demonstrated by instructions 27 through 29. Specifically, given that instruction 24 after all iterations provides a total of the HOURS WORKED FOR PAST MONTH, then instruction 27 loads the employee's HOURLY WAGE, and instruction 28 multiplies this value times that employee's HOURS WORKED FOR PAST MONTH. Consequently, the product, which is then in register REG2, represents the PAY DUE for that employee and, therefore, that value is written back to the record by instruction 29. Lastly, note further that still additional operations may take place, but the present example should be sufficient to explain further principles set forth below.

The present inventors now demonstrate a striding then looping pattern of operation which also has been observed in connection with the memory AREA format of FIG. 3. To better illustrate the memory AREA format, FIG. 7 once again illustrates the memory AREAs of FIG. 3, but those AREAs are extended to show the target data addresses for each of the WEEKLY HOURS WORKED fields. For example, AREA 1 stores the WEEKLY HOURS WORKED for Abe Adams in addresses 1221, 1224, 1127, and 122A. Similarly, AREA 2 stores the WEEKLY HOURS WORKED for Barry Barnes in addresses 2221, 2224, 2127, and 222A, and AREA 3 stores the WEEKLY HOURS WORKED for Cindy Cox in addresses 5221, 5224, 5227, and 522A.

Turning now to the demonstration of the striding then looping pattern, the following discussion traces the pseudo code of Table 4 through the processing stage of the records of FIG. 6b. Turning to the pseudo code, for J=1, record 62 (i.e., Abe Adams) is processed. Instruction 21 clears register REG2 which will store the total, and instruction 22 begins a loop to process each of the four WEEKLY HOURS WORKED fields for the record. Next, instruction 23 loads the target data of Abe's WEEKLY HOURS WORKED [#1] (ie., 40), which is located at the target data address of 1221. Instruction 24 then adds the loaded value with the value in register REG2, and stores the value to register REG2. At this point, therefore, since register REG2 was cleared to zero, a total of 40 is stored to register REG2. Next, instruction 25 returns the program to instruction 23 (i.e., for K=2), which therefore represents a second incident of instruction 23. This second incident of instruction 23 loads the target data of Abe's WEEKLY HOURS WORKED [#2] (i.e., 50), which is located at the target data address of 1224. Instruction 24 then adds the loaded value (i.e., 50) with the value in register REG2 (ie., 40), and stores the value (i.e. 90) to register REG2. The above repetition of instructions 23 through 24 then occurs again for K=3 and K=4. Thus, a third incident of instruction 23 loads the target data of Abe's WEEKLY HOURS WORKED [#3] (i.e., 50), which is located at the target data address of 1227, and instruction 24 then adds the loaded value (i.e., 50) with the value in register REG2 (i.e., 90), and stores the value (i.e. 140) to register REG2. Still further, a fourth incident of instruction 23 loads the target data of Abe's WEEKLY HOURS WORKED [#4] (i.e., 45), which is located at the target data address of 122A, and instruction 24 then adds the loaded value (i.e., 45) with the value in register REG2 (ie., 140), and stores the value (i.e. 185) to register REG2. At this point, the program continues to instruction 26, which stores the total in register REG2 (i.e., 185) to the memory address corresponding to the HOURS WORKED FOR PAST MONTH for Abe Adams, which therefore stores the value of 185 to memory address 121C. Lastly, instructions 27 through 29 also calculate the PAY DUE for Abe Adams as described above.

Given the above, note that a single iteration of J=1 presents a type of predictability of data loads known as striding. Striding, by itself, is known in the art, as its recognition and prediction thereafter of data fetching in a striding manner. However, after the following discussion of striding in a single iteration of the example presented in the immediately preceding paragraph, it is further demonstrated how striding may be combined with loop detection under the present embodiments, providing still additional benefits over the prior art. In general, striding refers to a data processing pattern where data is fetched in a successive manner such that, once an initial fetch (and its address) is established, a fixed distance referred to a "stride" is taken for the next successive fetch. For example, if the initial fetch address is decimal 1000 and the stride is decimal 10, then the address sequence for the fetches is 1000, 1010, 1020, 1030, and so forth. For more information about striding as known in the art, the reader is invited to review the following two documents, both of which are hereby incorporated herein by reference: (1) "Stride Directed Prefetching in Scalar Processors", by John W. C. Fu of Intel Corp, and Janak H.

Patel and Bob L. Janssens of the Center for Reliable and High-Performance Computing at the University of Illinois, published by the IEEE as document number 0-81 86-3175-9/92, copyright 1992; and (2) "Hardware Support for Hiding Cache Latency", by Michael Golder and Trevor N. Mudge of the Advanced Computer Architecture Lab at the University Of Michigan, dated Jan. 13, 1995.

As introduced above, a single iteration of J=1 above presents an example of striding. For example, for J=1, consider each occurrence of K for instruction 23. First, for J=1, and for K=1, instruction 23 required data from target address 1221. Second, for J=1, and for K=2, instruction 23 required data from target address 1224. Third, for J=1, and for K=3, instruction 23 required data from target address 1227. Lastly, for J=1, and for K=4, instruction 23 required data from target address 1221A. Note therefore that over four incidents of instruction 23, its target data addresses were 1221, 1224, 1227, and 122A. Thus, in the context of striding, an initial fetch was to address 1224, with a stride of three for each of the next three accesses.

While the preceding paragraphs demonstrate striding, note now that the example of Table 4 further demonstrates looping in combination with striding, where that combination may be detected by the present embodiments and encoded into LTB 56 as detailed later. More specifically, after K iterates from 1 to 4 for J=1 as detailed immediately above, J is incremented to 2. In the prior art where only striding is predicted, for the next incidence of instruction 23 a stride of three would be added to the last accessed address (i.e., 122A), thereby resulting in a prediction that this next incidence of instruction 23 will used the data at address 122D. However, such a prediction is inaccurate. Specifically, when J=2, the first incident of instruction 23 requires the WEEKLY HOURS WORKED [#1] for record 64, and that value is stored at address 2221 in memory AREA 2 of FIG. 7. As detailed below, however, the present embodiments may accurately predict this change from the stride, thereby further improving upon the prior art.

By continuing with the example of instruction 23 of Table 4 and the records in the memory AREAs of FIG. 7, one skilled in the art will appreciate the pattern of striding then looping in a repeated manner as recognized by the present inventors and accommodated by the present embodiments. Continuing with the discussion of the example from above, note that as of this point in the example, the target data addresses accessed by instruction 23 are 1221, 1224, 1227, and 122A. Note now the target data address sequence for successive incidences of instruction 23. Thus, address 2221 is accessed when J=2 and K=1. Consider now the remaining three iterations of K while J=2. For J=2, and for K=2, instruction 23 requires data from target address 2224. For J=2, and for K=3, instruction 23 requires data from target address 2227. For J=2, and for K=4, instruction 23 requires data from target address 222A. Note therefore that over four incidents of instruction 23 when J=2, its target data addresses were 2221, 2224, 2227, and 222A. Without stating the detail of each of the successive incidences of instruction 23, one skilled in the art will appreciate that, for J=3, the four occurrences of instruction 23 will require data from target addresses 5221, 5224, 5227, and 522A. At this point, however, recall that after memory AREA 3 is processed, the process loops back to AREA 1. Thus, for J=4, the first occurrence of instruction 23 will loop back to require data from target address 1221. Thereafter, the next three occurrences of instruction 23 will require data from target addresses 1224, 1227, and 122A.

Given the above, the combination of striding then looping may be summarized. For J=1, instruction 23 executes four times, and strides a distance of three during those times (e.g., addresses 1221, 1224, 1227, and 122A). However, J is then incremented so that the next execution of instruction 23 does not stride a distance of three. Instead, the beginning of a loop in the manner of the earlier embodiments is formed when instruction 23 requires data from address 2221. Thereafter, instruction 23 again strides a distance of three for the next three accesses. At this point, once again the loop continues when instruction 23 next requires the data from address 5221. After three more strides of distance three, the loop is then completed as instruction 23 next requires data from the same address at which the loop began, namely, address 1221. Summarizing all incidents of instruction 23, therefore, it strides from 1221, to 1224, to 1227, to 122A, then loops to 2221, from where it strides to 2224, to 2227, to 222A, then loops to 5221, from where it strides to 5224, to 5227, to 522A, and then loops back to 1221, to continuously repeat this pattern for all occurrences of instruction 23.

Figure 8:
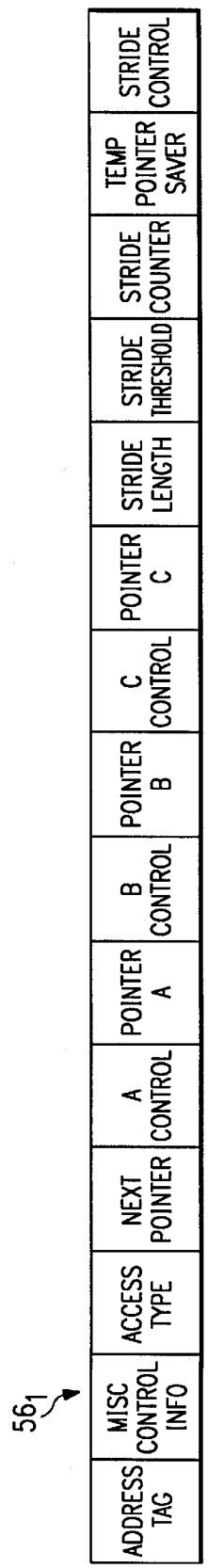
FIG. 8 illustrates a second embodiment of an entry in an LTB, where the embodiment accommodates both a striding data pattern or a looping data pattern, or a combination of the both a striding data pattern and a looping data pattern.

Given the above, FIG. 8 illustrates an additional embodiment of a single entry $56_1$ set forth in LTB 56 introduced above, where entry $56_1$ includes the same values as in FIG. 4 shown above, but includes an additional five values where those values permit the present embodiment to predict various stride patterns either alone, or in combination with looping as set forth above. With respect to the first ten values of entry $56_1$, the reader is referred to the earlier discussion. Thus, the following discussion focuses on the newly added values shown in FIG. 8. Briefly, the values newly shown in FIG. 8 include a STRIDE LENGTH, a STRIDE THRESHOLD, a STRIDE COUNTER, a TEMPORARY POINTER SAVER, and a STRIDE CONTROL. Moreover, note that while FIG. 8 demonstrates one set of stride-related values to be shared by each of the three POINTERs as detailed below, in an alternative embodiment each POINTER and its associated CONTROL could have its own set of stride-related values. In this alternative, therefore, a more complex data pattern could be predicted whereby, for a single data fetching instruction, the length and/or threshold for one stride sequence differed from that of the next stride sequence. In any event, each of these stride-related values is discussed below.

To demonstrate the information and operation of the stride-related values shown in FIG. 8, an introductory explanation is first presented for each of those values, with sample information provided in the context of the example of instruction 23 of Table 4, above. Thus, before proceeding, recall that it was shown above how instruction 23 progressed by striding through the following target data addresses: 1221, 1224, 1227, and 122A. Turning then to the stride-related values in FIG. 8, the STRIDE LENGTH value identifies the magnitude of the difference between successive stride target data addresses. Thus, in the current example, STRIDE LENGTH equals three, that is, the stride between address 1221 to 1224 is three, from address 1224 to 1227 is three, and so forth. The STRIDE THRESHOLD is the number of target address in a given series of strides. Thus, in the current example, STRIDE THRESHOLD equals four (i.e., there are four addresses in the sequence of 1221, 1224, 1227, and 122A). Next, the STRIDE COUNTER is a counter which advances for each stride in a given series of strides. By advancing, it is intended to indicate that the COUNTER may either increment or decrement so as to keep track of each successive stride. To achieve this functionality in the preferred embodiment, and as detailed later, the STRIDE COUNTER is initially loaded with the STRIDE THRESHOLD, and then decrements to a value of zero as each stride is taken. The TEMPORARY POINTER SAVER is used to store the initial address in the sequence of stride addresses. Thus, in the present example, the address of 1221 is stored to the TEMPORARY POINTER SAVER. As detailed later, at the conclusion of the stride sequence, this address is then returned to the one of the POINTERs (i.e., A, B, or C) which initially provided it. Note further that, instead of having the TEMPORARY POINTER SAVER, in an alternative embodiment the initial address may instead be re-calculated at the conclusion of the stride sequence, with the re-calculated initial address then being returned to the POINTER which initially provided it. Lastly, the STRIDE CONTROL merely provides additional information which may be implemented by a person skilled in the art to control operation of stride techniques either alone or in combination with looping as further demonstrated below.

Having introduced the various stride-related values of FIG. 8, recall that each of the POINTERs A, B, and C has a corresponding CONTROL value, and the content of those values as they related to looping were introduced above in connection with Table 3 insofar as they relate to looping data patterns. However, as now introduced and as further detailed below, the embodiment of FIG. 8 further accommodates various stride-related patterns as well. To further implement this functionality, note now that the CONTROL information corresponding to each POINTER may further indicate a stride-related operation and, in this regard, Table 5 below repeats the values of Table 3, but further defines some of the reserved values from Table 3 so as to accommodate various stride operations:

TABLE 5

| CONTROL | INDICATION |
|---|---|
| 000 | Pointer is invalid |
| 001 | Stride mode, STRIDE LENGTH has amount |
| 010 | Stride mode, stride = LENGTH1 |
| 011 | Stride mode, stride = LENGTH2 |
| 100 | Loop mode, next pointer = A |
| 101 | Loop mode, next pointer = B |
| 110 | Loop mode, next pointer = C |
| 111 | Reserved |

Given Table 5, a binary value of CONTROL information equal to 001, 010, or 011 indicate that the POINTER corresponding to the CONTROL relates to a stride activity, with the difference being the magnitude of the stride. The specific stride differences are discussed below.

Figure 9:
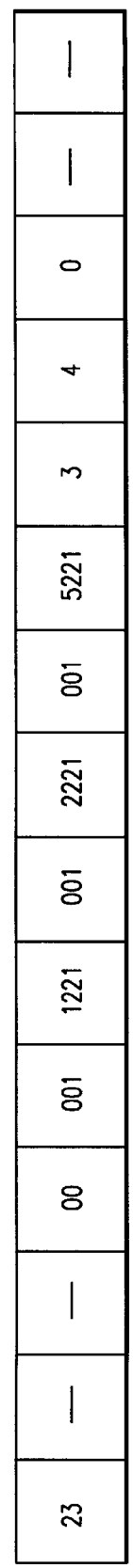
FIG. 9 illustrates the LTB entry of FIG. 8 with certain values completed so as to illustrate looping between three successive addresses of 1221, 2221, and 5221, as well as striding from address 1221 through address 122A.

From Table 5, it is shown that a binary value of CONTROL information equal to 001 indicates a stride mode, where the STRIDE LENGTH value of an entry in LTB 56 stores the length of the stride. To illustrate this aspect, the following discussion traces through the example code of Table 4 and, more particularly, how an entry $56_1$ in LTB 56 relates to the stride-operations of instruction 23. Toward this end, FIG. 9 illustrates entry $56_1$ as it has been established to permit data prefetch predictions for instruction 23 during stride operation. Note also that the steps for establishing instruction 23 are detailed later. Turning to FIG. 9, assume therefore that entry $56_1$ has earlier been established and that the pseudo code of Table 4 is to be fetched and processed by pipeline 38 introduced above. Thus, instruction fetch stage 40 fetches instruction 23 and, as in the instances described above, detects that it is a data fetching instruction. Thus, LTB 56 is consulted to determine whether it stores an entry corresponding to instruction 23. Specifically, the address tag field in entry $56_1$ is determined to match the address of instruction 23 and, therefore, it is determined that LTB 56 has such an entry. Next, the NEXT POINTER value of entry $56_1$ is consulted and it indicates that POINTER A and its corresponding A CONTROL should control the current prefetch request, if any, to the target data address for instruction 23.

Figure 10:
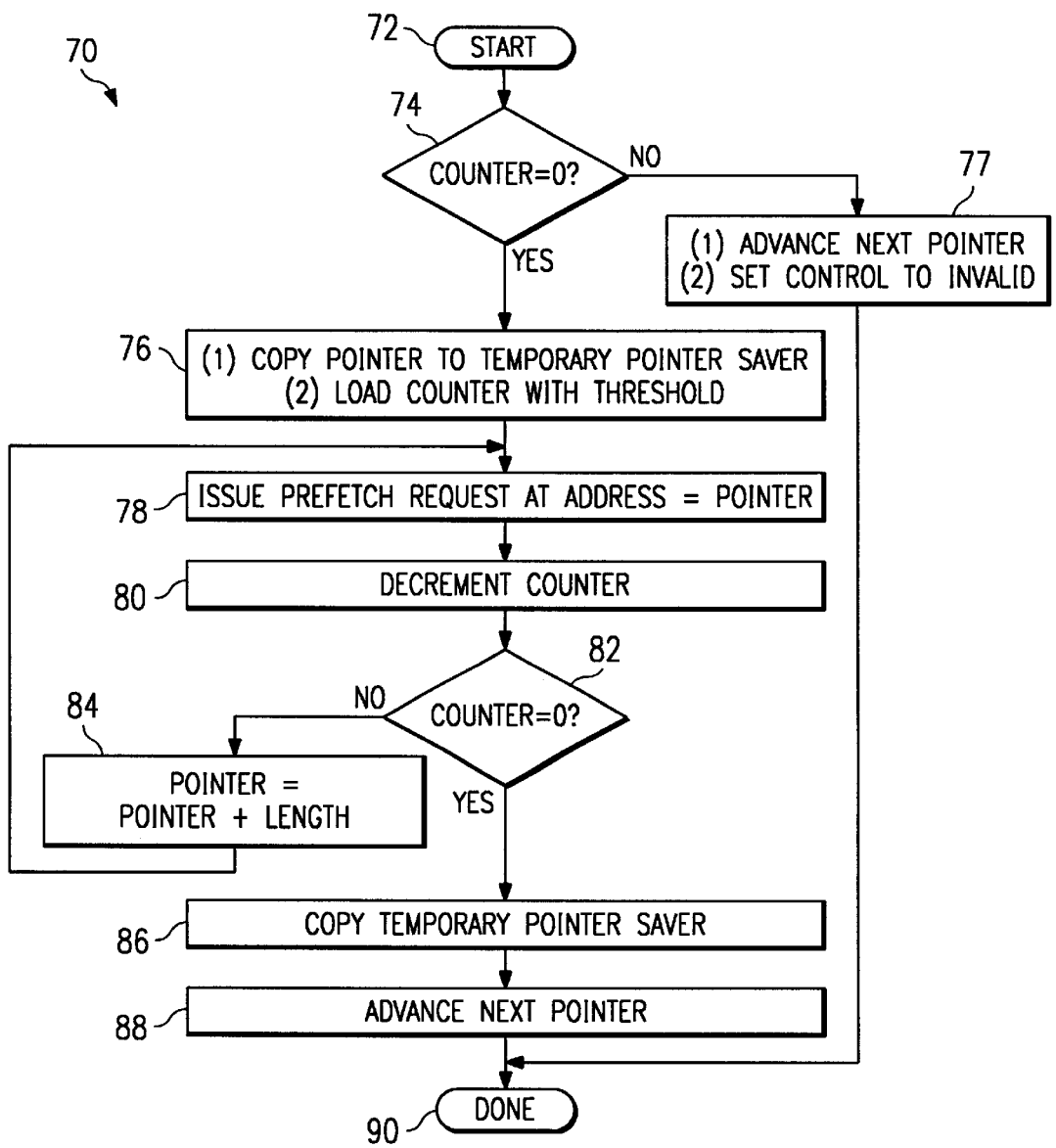
FIG. 10 illustrates a method of operation in response to the LTB entry of FIG. 8 such that successive prefetch requests are issued for successive stride addresses.

In response to the above, the A POINTER CONTROL INFORMATION is evaluated, and it indicates (i.e., a value of 001) that the current access is part of a stride, where the length of the stride is stored in the STRIDE LENGTH value. To further illustrate the steps taken from this point forward, FIG. 10 illustrates a method designated generally at 70 which depicts the various preferred steps in response to the current type of stride operation. Method 70 is shown to generally begin with a step 72, which merely demonstrates that the method has commenced in response to a CONTROL information value equal to 001 (or to any of the other control values which indicate a stride mode of operation). Next, method 70 continues to step 74, which examines whether the STRIDE COUNTER equals zero. As better appreciated once the discussion of method 70 is complete, because this is the first incident of instruction 23 for the stride sequence of 1221, 1224, 1227, and 122A, the STRIDE COUNTER should have been reset to zero; thus, step 74 should be found to be true and method 70 continues to step 76. If, for some reason, on this first incident of an instruction in a stride sequence the value of the STRIDE COUNTER is non-zero, method 70 continues to step 77 which is an example of an error handler for responding to the erroneous setting of the STRIDE COUNTER.

The error handling of step 77 performs two operations. First, the CONTROL information for the current POINTER is set to invalid. Thus, in the current example, the A CONTROL would be set to 000. Second, the NEXT POINTER value is advanced to point to the next successive POINTER. Thus, in the current example, the value of NEXT POINTER would be set to 01. Finally, once this error handling is complete, the flow passes from step 77 to step 90 which, as also stated below, merely represents the end of method 70 for the current processing of entry $56_1$.

Step 76 is reached after the SIDE COUNTER is found to equal zero as is the case for a valid entry in LTB 56 where a data fetching instruction which is to begin striding as in the current example of instruction 23. Step 76 then performs two set up operations. First, step 76 copies the value of the current POINTER to the TEMPORARY POINTER SAVER. Thus, in the current example, the value of 1221 stored in POINTER A is copied to the TEMPORARY POINTER SAVER, from where it is later retrieved into POINTER A for reasons more clear below. Second, step 76 loads the STRIDE COUNTER with the STRIDE THRESHOLD, so that count may decrement as introduced above for each successive stride occurrence, also as further detailed below. After these two set up operations, method 70 continues to step 78.

Step 78 issues a prefetch request to commence at the address indicated by the corresponding POINTER. Thus, in the current example, because POINTER A is at issue, step 78 issues a prefetch request to the target data address of 1221. Note therefore that if this prefetch request instigates an actual prefetch operation, the data at address 1221 may be retrieved into an on-chip cache as discussed above and, therefore, will be readily available to be fetched from that cache once instruction 23 reaches the appropriate time as it passes through pipeline 38. Again, therefore, the benefit of prefetching may be realized, while here it is demonstrated in the first instance of a stride sequence of addresses. Next, method 70 continues to step 80.

Step 80 decrements the value in the STRIDE COUNTER. In the current example, recall from FIG. 9 that the STRIDE COUNTER stores the value of four from the STRIDE THRESHOLD. Therefore, step 80 decrements this value from four to three. As better appreciated below, for each successive issuance of a prefetch request by the immediately preceding step 78, step 80 will again decrement the count which, therefore, ultimately will reach zero to designate that all stride instances for a given sequence of stride addresses have occurred. Next, method 70 continues to step 82.

Step 82 again determines whether the STRIDE COUNTER has reached zero. As stated in the immediately preceding paragraph, a count of zero will be reached once all stride instances for a given sequence of stride addresses have occurred. If the STRIDE COUNTER has not reached zero, method 70 continues to step 84. On the other hand, if the STRIDE COUNTER has reached zero, method 70 continues to step 86. In the current example, the STRIDE COUNTER equals three and, thus, method 70 continues to step 84.

Step 84 increases the value of the current pointer by the value of the STRIDE LENGTH. Thus, in the current example, POINTER A equals 1221 and the STRIDE LENGTH equals three. Consequently, in response to step 84, the value in POINTER A is increased from 1221 to 1224. Next, method 70 returns to step 78.

Given the above discussion, one skilled in the art will appreciate that the return of method 70 from step 84 to step 78 will cause one or more additional prefetch requests to be issued, where each successive prefetch request issues the address of the previous prefetch address plus the value of the STRIDE LENGTH. For example, recall that the first instance of step 78 issued a prefetch request at 1221, and the POINTER A value was thereafter increased by the STRIDE LENGTH of three to a value of 1224. Next, therefore, step 78 will once again issue a prefetch request, but here at address 1224. Still further, step 80 will then again decrement the STRIDE COUNTER, but here from three to two, followed by step 82 passing control to step 84, increasing POINTER A, and continuing in this manner. Given this process, note therefore that step 78 will issue prefetch requests for the sequence of 1221, 1224, 1227, and 122A. After the issuance of the prefetch request at address 122A, however, step 80 will again decrement the STRIDE COUNTER. At this point, therefore, the STRIDE COUNTER is decremented from one to zero. Consequently, step 82 then passes control to step 86. Note therefore that this change of control occurs after all addresses in the stride sequence (i.e., 1224, 1224, 1227, and 122A) have been the subject of a prefetch request.

Step 86, having been reached after issuance of all prefetch requests corresponding to a sequence of striding addresses, copies the value from the TEMPORARY POINTER SAVER back to the current POINTER. In the current example, recall that before step 86 the value of POINTER A equals address 122A, that is, the last address in the sequence of stride addresses 1221, 1224, 1227, and 122A. Step 86, however, by copying back from the TEMPORARY POINTER SAVER, restores the value in the current POINTER to that which it was at the beginning of the sequence of stride addresses. In the current example, therefore, the value of 1221 which was earlier (i.e., in step 76) stored into the TEMPORARY POINTER SAVER is now restored into POINTER A. Thus, one skilled in the art will appreciate that in the next instance of a prefetch request based on POINTER A, that request will once again be directed to the address at the beginning of the stride sequence rather than at the end of it. Additionally, and as mentioned above in connection with the introduction of the TEMPORARY POINTER SAVER, as an alternative to using that SAVER the result of step 76 could be achieved by re-calculating the initial address which otherwise is stored in the SAVER. For example, given the ending address of 1221, the STRIDE LENGTH could be multiplied times the value of (STRIDE THRESHOLD minus one), and that product could be subtracted from the ending address, thereby providing the initial address to re-store to POINTER A After step 86, method 70 continues to step 88. Step 88 advances the NEXT POINTER indicator for the entry of LTB 56 at issue. In the current example, recall from FIG. 9 that the value of the NEXT POINTER is currently set to 00, that is, it points to POINTER A per the values set forth in Table 2. Thus, step 88 advances the NEXT POINTER value to 01, thereby setting it to indicate that POINTER B is the next POINTER to be consulted for the next instance where line $56_1$ is used. In other words, the next time instruction 23 is detected in response to being fetched by fetch stage 40, line $56_1$ will again be used, but at that time POINTER B and its B CONTROL will control based on the current advancement by step 88 of the NEXT POINTER. Note further that this advancement of the NEXT POINTER continues for each successive POINTER in entry $56_1$ in a looping fashion. In other words, if NEXT POINTER is set to indicate POINTER C when step 86 is reached, then advancing the NEXT POINTER in that instance would cause it to point to POINTER A as the next POINTER; thus, the circular fashion is formed from POINTER A, to POINTER B, to POINTER C, back to POINTER A, and so forth.

In addition to the operation of step 88 as just described, note further that still another embodiment may be created within the inventive scope by permitting a stride to complete and a loop to a POINTER other than the next POINTER in the circular order. In other words, the preceding paragraph described the instance of advancing the NEXT POINTER from POINTER C to POINTER A, thereby maintaining the circular looping fashion after the stride sequence related to POINTER C is complete. In other words, given the stride control values provided by Table 5, the preceding paragraph implies that after a stride sequence is complete, the NEXT POINTER is merely incremented, such that the next target data address will be indicated by the POINTER in the circular order which follows the POINTER which was just used in connection with the now-completed stride sequence. However, note now that as an alternative embodiment still additional control may be permitted so that a different POINTER is the NEXT POINTER after a stride sequence is complete. For example, an additional value could be included in each LTB entry, or the number of bits in the CONTROL could be increased. In either event, the additional capability would permit the completion of a stride sequence followed by a designation of a POINTER which does not circularly follow the POINTER just used. For example, in the above example where POINTER A governed the stride sequence, this additional control could cause the NEXT POINTER to change to 10, thereby indicating that POINTER C (rather than POINTER B as in the above example) is the next POINTER to be consulted for the next incident of the data fetching instruction. Thus, even more complicated data patterns than those described above could be detected and indicated in each LTB entry.

After step 88, method 70 reaches step 90. Recall also that step 90 may be reached following the error handling of step 77 as well. In any event, step 90 merely represents the conclusion of method 70 for a given entry into LTB 56, where that entry is based upon the stride mode of operation. Thus, after step 90, method 70 may be repeated numerous additional times, where those times are once again commenced in response to a match being found between a fetched instruction and an entry in LTB 56, where the matching LTB entry has an appropriate CONTROL information value set to indicate a stride mode, and where the length of the stride is set forth in the STRIDE LENGTH value.

From the above discussion, one skilled in the art will appreciate that the embodiment of FIG. 8 permits prefetch requests to be issued to a sequence of striding addresses. Indeed, note further that by continuing with the present example, one skilled in the art will appreciate that the embodiment of FIG. 8 also permits looping between striding addresses. More particularly, by looking again to FIG. 9, note that the B POINTER identifies address 2221. Recall also that step 88 from the above example changed the NEXT POINTER to indicate POINTER B to be the next POINTER to be consulted for the next instance where line $56_1$ is used. Thus, continuing with the present example, when instruction 23 is next detected in response to being fetched by fetch stage 40, line $56_1$ will again be used to predict the fetch, but at this point B CONTROL and POINTER B are used. Note further that B CONTROL indicates a looping mode, so again a prefetch request will issue for this instance of instruction 23 to address 2221, but will be followed by three strides for each of the next three incidents of instruction 23, that is, the next three such incidents will give rise to prefetch requests to addresses 2224, 2227, and 222A. Still further, once address 222A is issued as part of a prefetch request, again the NEXT POINTER is incremented, this time indicating POINTER C and its C CONTROL as controlling for the next access. Continuing, one skilled in the art will appreciate that once again a stride pattern of addresses will occur for the next four incidents of instruction 23, with those addresses including 5221, 5224, 5227, and 522A. Finally, when this is complete, again the NEXT POINTER is incremented, this time completing the loop back to cause POINTER A and its A CONTROL as controlling for the next access. Thus, this pattern may repeat numerous times, thereby providing a combined stride then loop functionality.

Note also that the example above assumed a CONTROL information value for each of the POINTERs where the CONTROL value equals 001, that is, indicating a stride mode where the magnitude of the stride was stored in the STRIDE LENGTH value of entry $56_1$. However, note now that the CONTROL values equal to 010 and 011 may be used as alternatives, where each of those values correspond to a known fixed length (shown as LENGTH1 and LENGTH2 in Table 5). For example, LENGTH1 may be a value of three bytes, in which case the previous example using the value from the STRIDE LENGTH value could instead have been achieved using a CONTROL value of 010, and from that CONTROL value it would be known to use a stride length of three when calculating the next predicted address for which a prefetch request is issued. As another example, LENGTH2 could be the size of one word for a given architecture, which therefore may be four bytes for some machines. Thus, in such an instance, if a CONTROL value equals 011, then the STRIDE LENGTH value of the entry need not be consulted and, instead, the fixed value of four bytes as known from the 011 encoding would be used to calculate successive stride addresses. In addition to the above, note further that for even more complex striding data patterns, the CONTROL corresponding to one POINTER may differ in mode from that of another. For example, the A CONTROL could be 001, while the B CONTROL is 010, and the C CONTROL is 011. Thus, each of the CONTROLs relates to a stride mode, but of differing stride lengths. Still other examples will be appreciated by one skilled in the art.

In the context of the patterns of addresses above, note that it has been stated to this point that the prefetch request is issued and, thus, it is not affirmatively stated that the request will actually cause a prefetch operation. In other words, once a prefetch request is issued, it is not known by the requesting circuit whether the prefetch operation in response to that request actually takes place. If the prefetch operation does take place, then presumably the requested data is thereafter available in an on-chip cache so that the data may be used by an actual fetch from that cache. However, in some instances, it may be desirable to not service the prefetch request, that is, to not permit a prefetch operation in response to the prefetch request Two examples of such instances are described below.

As a first example of an instance where a prefetch request is issued yet a prefetch in response to that request may or may not occur, in yet another aspect of the present embodiments, one or more additional values may be added to each entry in LTB 56, or some additional circuit may be connected having access to the entries described above, for evaluating a current prefetch request relative to a past prefetch request, where the evaluation is based on cache-line crossing. More particularly, there are various circuits known in the art for evaluating two addresses to determine whether a subsequent address is within the same cache line as a prior address. If not, the subsequent address is said to be line-crossing relative to the prior address, that is, its address crosses the boundary between one cache line and another cache line corresponding to the prior address. In the context of the present embodiment, this functionality is used in combination with stride operations to further improve performance. More specifically, as each successive stride address is issued as part of a prefetch request, the stride address is preferably submitted to such a line-crossing detection circuit. If a subsequent address does not cross a cache line, then it therefore is seeking data which was presumably was sought (and/or prefetched) in connection with the preceding stride address. Thus, absent other considerations, the subsequent prefetch request need not cause a prefetch operation because the preceding address already caused a prefetch operation, and that operation ensured that the data which would be sought by the subsequent prefetch request is already in the cache. To better illustrate this, return to the example of instruction 23, which recall when handled by method 20 issued the stride addresses of 1221, 1224, 1227, and 122A. Now, suppose that addresses 1221 and 1224 are aligned in one cache line, while addresses 1227 and 122A are aligned in a second cache line. For the first incident of instruction 23, it is shown above that a prefetch request is issued corresponding to address 1221. Because this is the first address in the sequence, and absent some other reason, then a prefetch operation is permitted to occur in response to the prefetch request. Thus, the data at address 1221 is prefetched into an on-chip cache. However, because address 1224 is also in the same cache line as address 1221, then at the same time that the address for 1221 is prefetched in this manner, so will be the data at address 1224. Next, for the second incident of instruction 23, it is shown above that a prefetch request is issued corresponding to address 1224. Here, however, the cache line-crossing detection circuit detects that the current address 1224 is in the same cache line as the preceding address 1221. In response, although a prefetch request is preferably issued for the data at address 1224, in response no prefetch operation is preferably performed at this point because the sought data was earlier already prefetched into the cache at the same time as was the data at address 1221. Continuing with this example, for the third incident of instruction 23, it is shown above that a prefetch request is issued corresponding to address 1227. Here, the cache line-crossing detection circuit detects that the current address 1227 is not in the same cache line as the preceding address 1224. Therefore, in response to the prefetch request issued for the data at address 1227, a prefetch operation is preferably permitted to occur, thereby fetching the data at address 1227 (and 122A) into a different cache line, again thereby having that data available on-chip for a subsequent fetch.

As a second example of an instance where a prefetch request is issued yet a prefetch in response to that request may or may not occur, and as introduced much earlier, recall that additional system parameters may bear on the efficiency of whether the prefetch operation should take place, or indeed whether the request should be modified such that a different yet related and responsive prefetch operation occurs. Again, to accommodate these additional considerations, the reader is once again referred to the earlier incorporated by reference U.S. Patent application Ser. No. 08/999,091, entitled "Circuits, Systems, And Methods For Prefetch Handling In A Microprocessor-Based System" (Attorney Docket Number TI-24153).

Having described the stride operation followed by looping operation accomplished by entry $56_1$ of FIGS. 8 and 9, and to further illustrate the characteristics of entry $56_1$ of those Figures as well as the various aspects introduced above, the following discussion now traces through the establishment of the values within entry $56_1$ of FIG. 9 in connection with instruction 23 of the example of Table 4. Recall that the program of Table 4 is stored as instructions in a memory accessible to microprocessor 12, such as in external memory 14. Thus, to process those instructions, each instruction is fetched into pipeline 38 to pass through it toward its execution stage 48. During this process, therefore, instruction 23 is fetched by instruction fetch stage 40 for a first time (i.e. for J=1 and K=1). At this point, it is detected, by techniques known in the art, that the instruction is a data fetching instruction, such as a load, a store, a store interrogate, and so forth. In response to detecting that instruction 23 is data fetching instruction, the same initial steps are taken as were described above in connection with entry $56_1$ of FIG. 5. Thus, the reader is referred to that prior discussion rather than re-stating all of those details here. Briefly, recall that first LTB 56 is consulted to determine whether one of its entries corresponds to instruction 23 and an entry is either verified to exist or one is created in a new row within LTB 56 (e.g., by evicting the least recently used entry in LTB 56). Recall further, however, that entry $56_1$ of FIG. 4 did not include stride-related attributes, and the default prediction was that a loop was involved. Thus, for entry $56_1$ of FIG. 4, after receiving a data fetching instruction and entering its target data address into the entry, the value of the NEXT POINTER is set to 01 to indicate that POINTER B is the next pointer to be consulted upon the next incident of the data fetching instruction. In the present embodiment of entry $56_1$ of FIG. 8, however, note that it includes various additional stride-handling capabilities. Consequently, as further demonstrated below, its default prediction is that the address sequence will be striding instead of looping. Thus, the value of the NEXT POINTER is maintained at 00, that is, to indicate that POINTER A is the next pointer to be consulted upon the next incident of instruction 23. However, because there is only a single target data address at this point, it is stored in POINTER A as well as to the TEMPORARY POINTER SAVER, and the A CONTROL is set to 001 which, recall from Table 5 indicates a stride mode entry with the stride length being stored in the STRIDE LENGTH value. In addition, the STRIDE COUNT is initialized to one, because the value in POINTER A is predicted to be the first address in a sequence of stride addresses. Lastly, note that the STRIDE CONTROL is set to incomplete. In other words, at the current point of the example, it is unknown whether the stride sequence is complete. Thus, for control purposes as appreciated below, a value (e.g., a certain binary code) is set within the STRIDE CONTROL to indicate this incomplete status.

The second incident of instruction 23 causes a hit in the LTB, and in response it is determined that the NEXT POINTER is POINTER A, the CONTROL value for POINTER A is set to 001 (i.e., a stride mode entry), the STRIDE COUNT is set to one, and the STRIDE CONTROL is set to incomplete. In response, the actual target data address from this second incident is used to calculate a difference between that value and the value already stored in POINTER A (i.e, the actual target data address from the first incident of instruction 23). In the current example, therefore, the first incident target data address of 1221 is subtracted from the second incident target data address of 1224, thereby leaving a difference of three. Moreover, because the default mode is predicted as a stride mode, this difference is now stored in the STRIDE LENGTH value of entry $56_1$. Moreover, the STRIDE COUNTER is now incremented from one to two, because the default prediction is that this second incident of instruction 23 is the second in a series of stride addresses. Still further, the current target data address (i.e., 1224) is stored to POINTER A. Lastly, because only two successive addresses have been received and analyzed, the NEXT POINTER remains at 00 to identify POINTER A, the A CONTROL remains at 001, and the STRIDE CONTROL continues to indicate an incomplete status.

The third incident of instruction 23 again causes a hit in the LTB, and in response it is again determined for the corresponding entry that the NEXT POINTER is POINTER A, and that the A CONTROL is set to 001. Here, however, it is further detected that the STRIDE COUNTER is greater than one; from this indication in combination with the STRIDE CONTROL value of incomplete, it is known that a stride sequence is being established, is not yet complete, and has only covered two incidents of the data fetching instruction. Thus, again the actual target data address from this third incident is used to calculate a difference between that value and the value already stored in POINTER A (i.e., the actual target data address from the second incident of instruction 23) and, therefore, in the current example, the difference equals three. Next, this difference is compared against that already stored in the STRIDE LENGTH. In the current example, therefore, a match is found and, thus, it is presumed that the stride sequence of addresses is continuing. Consequently, the same difference (of three) remains in the STRIDE LENGTH value. Moreover, the current target data address (i.e., of 1227) is stored in POINTER A. Still further, the STRIDE COUNTER is now incremented from two to three.

The fourth incident of instruction 23 again causes a hit in LTB 56 with the corresponding NEXT POINTER set to POINTER A, the A CONTROL set to 001, and the STRIDE CONTROL set to incomplete. However, because the STRIDE COUNTER is greater than two (e.g., is currently equal to three), then it is now predicted that the actual target data address for this fourth incident of the data fetching instruction will be the value in POINTER A (i.e., the value from the third incident of the instruction) plus the amount stored in the STRIDE LENGTH. In other words, it is now predicted that this fourth incident will once again be a stride in the sequence which commenced with the first through third incidents discussed above. Therefore, in the current example, the value of three in the STRIDE LENGTH is added to the value of 1227 in POINTER A, and the resulting target data address of 122A is used to issue a prefetch request at that address. In addition, eventually this fourth incident of the instruction will permit the instruction to pass sufficiently along pipeline 38 so that an actual target data address is issued. In response, the actual target data address from this fourth incident is used to calculate a difference between that value and the value from the third incident of instruction 23 earlier stored in POINTER A to confirm the prediction that this fourth incident was once again a stride. Here, the difference equals three and, therefore, when compared against that already stored in the STRIDE LENGTH results in a match. Therefore, it has been confirmed that the predicted target data address was accurate and, therefore, it is further presumed that the stride sequence of addresses is continuing. Consequently, the same difference (of three) remains in the STRIDE LENGTH value, and the STRIDE COUNTER is now incremented from three to four. Moreover, the current target data address (i.e., of 122A) is stored in POINTER A.

The fifth incident of instruction 23 again causes a hit in LTB 56 with the corresponding NEXT POINTER set to POINTER A, the A CONTROL set to 001, and the STRIDE CONTROL set to incomplete. Once again, because the STRIDE COUNTER is greater than two (e.g., is currently equal to four), then it is now predicted that the actual target data address for this fifth incident of the data fetching instruction will be the value in POINTER A (i.e., the value from the fourth incident of the instruction) plus the amount stored in the STRIDE LENGTH. Therefore, in the current example, the value of three in the STRIDE LENGTH is added to the value of 122A in POINTER A, and the resulting target data address of 122D is used to issue a prefetch request at that address. In addition, eventually this fifth incident of the instruction will permit the instruction to pass sufficiently along pipeline 38 so that an actual target data address is issued. In response, the actual target data address from this fifth incident is used to calculate a difference between that value and the value from the fourth incident of instruction 23 earlier stored in POINTER A to confirm the prediction that this fifth incident was once again a stride. Here, however, recall from the illustration of FIG. 7 that the actual target data address for the fifth incident of instruction 23 is 2221; therefore, the difference between this fifth address and the value of 122A stored in POINTER A is not equal to the difference of three already stored in the STRIDE LENGTH. Thus, in response to the mismatch, it is determined that the stride sequence up to the current incident is complete, that is, the sequence of addresses 1221, 1224, 1227, and 122A is complete. In response, therefore, the first address in that sequence is restored from the TEMPORARY POINTER SAVER back to POINTER A. Additionally, the incomplete status of the STRIDE CONTROL is now reset to indicate that the stride analysis for POINTER A is complete and, therefore, the STRIDE LENGTH has the appropriate distance between stride addresses in a sequence. Still further, recall that the STRIDE COUNTER was incremented for each address in the stride sequence. Thus, having concluded detection of the stride sequence, the value from the STRIDE COUNTER is now moved to the STRIDE THRESHOLD, and the STRIDE COUNTER is set back to one. Still further, the NEXT POINTER is now set to a value of 01, thereby indicating that POINTER B should control the next incident of the data fetching instruction. Lastly, the current target data address from the fifth incident of instruction 23 is stored to POINTER B as well as the TEMPORARY POINTER SAVER, and the B CONTROL is set to 001.

The sixth incident of instruction 23 is similar in various respects to the second incident above, but here the actions are taken with respect to POINTER B rather than POINTER A. Thus, in response to a hit in the LTB, it is determined that the corresponding NEXT POINTER is POINTER B, the CONTROL value for POINTER B is set to 001, the STRIDE COUNT is set to one, and the STRIDE CONTROL is set to incomplete. In response, the actual target data address from this sixth incident is used to calculate a difference between that value and the value of the fifth incident actual target data address already stored in POINTER B. In the current example, therefore, the fifth incident target data address of 2221 is subtracted from the sixth incident target data address of 2224, thereby leaving a difference of three. However, at this point, recall that POINTER A has already been fully established corresponding to a stride sequence, and recall that each POINTER shares the same stride resources. Thus, to the extent that POINTER B may also correspond to a stride sequence, it is now ensured that the stride LENGTH is the same for POINTER B as it is for the already-established stride sequence of POINTER A. Therefore, given the stride length of three calculated from the sixth and fifth actual target data addresses, this difference is compared to the value in the STRIDE LENGTH. Here, a match occurs and, therefore, the establishment of POINTER B in connection with a stride sequence may continue. Note, however, that if a match did not occur, then alternative steps would be implemented. For example, in an alternative embodiment mentioned earlier, each POINTER has its own corresponding stride attributes and, thus, POINTER B could be established to correspond a different type of stride sequence, that is, one with either or both a different STRIDE LENGTH or a different STRIDE THRESHOLD. Still other alternatives will be ascertainable by one skilled in the art. In any event, returning to the current example where the stride length matches, the STRIDE COUNTER is incremented from one to two, because the default prediction is that this sixth incident of instruction 23 is the second in a series of stride addresses with respect to POINTER B. Still further, the current target data address (i.e., 2224) is stored to POINTER B. Lastly, because only two successive addresses have been received and analyzed, the NEXT POINTER remains at 01 to identify POINTER B, the B CONTROL remains at 001, and the STRIDE CONTROL remains set to incomplete status.

Given the above, one skilled in the art will appreciate that the previous steps may repeat for the seventh, eighth, and ninth incidents of instruction 23 to also complete the values corresponding to POINTER B in a manner similar to the completion of POINTER A in connection with the third, fourth, and fifth incidents of instruction 23. Therefore, after the ninth incident of instruction 23, POINTER B will be restored with the address of 2221 from the TEMPORARY POINTER SAVER and the and the STRIDE CONTROL is reset to indicate a complete status. Thus, once POINTER B is next identified as the NEXT POINTER, it in combination with the stride values will predict a series of four stride addresses, those being 2221, 2224, 2227, and 222A. Still further, note that once the ninth incident is used to conclude that the current stride sequence is complete, the value of the STRIDE COUNTER is compared against the value of the STRIDE THRESHOLD, with this step again being required due to the sharing of stride-related values among multiple POINTERs. In other words, at this point, recall that the STRIDE THRESHOLD has already been fully established for the stride sequence of 1221, 1224, 1227, and 122A. Thus, to the extent that POINTER B may also correspond to a stride sequence, it is now ensured that the STRIDE THRESHOLD is the same for POINTER B as it is for the already-established stride sequence of POINTER A. Therefore, given the STRIDE THRESHOLD of four, it is compared to the value in the STRIDE COUNTER. Here, a match occurs and, therefore, the establishment of POINTER B in connection with a stride sequence is complete.

Note that after the B POINTER and its control are finalized to indicate a stride mode, sill an additional step may be taken to compare the values of POINTER A and POINTER B. If these two values match, then as an alternative prediction it may be predicted that instruction 23 repeatedly performs a stride sequence through four addresses, and then returns to the same original address (i.e., the address stored in both POINTERs A and B). In other words, it may be determined for a given stride sequence corresponding to POINTER A that the sequence completes, and then loops back to the beginning address of the same sequence. In this case, recall further that an alternative was described in connection with step 88 above whereby a stride may complete and be followed by a NEXT POINTER indication to a POINTER other than the next POINTER in the circular order. This current paragraph, therefore, benefits from such an alternative, where the alternative permits the stride sequence to complete, and the NEXT POINTER to identify the same POINTER which governed the now-complete stride. In other words, for the current example, the NEXT POINTER value would remain set to 00 so that, upon completing a stride sequence, the next incident of the data fetching instruction would again be governed by POINTER A which controlled the just-completed stride sequence as well.

Lastly, retuning to the example of FIG. 7 and the establishment of entry $56_1$, one skilled in the art will appreciate that the previous steps for the second set of stride addresses (i.e., 2221, 2224, 2227, and 222A) are again repeated for the tenth through thirteenth incidents of instruction 23 to complete the values corresponding to POINTER C. Therefore, after the thirteenth incident of instruction 23, POINTER C will be restored with the address of 5221 from the TEMPORARY POINTER SAVER, the C CONTROL will be set to 001, and the STRIDE CONTROL is reset to indicate a complete analysis. Thus, once POINTER C is identified as the NEXT POINTER, it in combination with the stride values will predict a series of four stride addresses, those being 5221, 5224, 5227, and 522A. In addition, after receiving an actual target data address for the thirteenth incident of instruction 23, one skilled in the art will appreciate that the NEXT POINTER points to POINTER A. Therefore, the actual target data address of the thirteenth incident is confirmed to match the target data address in POINTER A. In the current example, therefore, a match is found, thereby completing the loop from the end of the stride sequence relating to POINTER C to the beginning of the next stride sequence as identified by POINTER A.

Given the above, one skilled in the art will appreciate that after the thirteenth incident of instruction 23 that entry $56_1$ is complete (i.e., as shown in FIG. 9) and verified to accurately predict the stride then loop sequence depicted above. Thus, to facilitate use with the method of FIG. 10, note further that it is preferable to further modify entry $56_1$ so that the next incident (i.e., the fourteenth incident) of instruction 23 as well as other incidents thereafter may follow the method of FIG. 10. To accomplish this, therefore, the STRIDE COUNTER is preferably loaded with the STRIDE THRESHOLD, and then decremented once since the thirteenth occurrence of instruction 23, that is, the first incident in the current stride sequence, already has been handled in that an actual fetch of its target data has occurred. From this point forward, therefore, the method of FIG. 10 may issue prefetch requests as described above so long as the prediction of entry $56_1$ remains accurate.

Given the above, one skilled in the art will appreciate how the present embodiments may accurately predict both looping and striding data patterns for data fetching instructions. Additionally, while various examples of encoding are shown for those predictions, and while various techniques for establishing those encodings are shown, still other alternatives may be ascertained by a person skilled in the art. For example, while the embodiment of FIG. 4 has three POINTERs (and their corresponding CONTROL fields) which are preferred to detect a pattern such as that introduced in FIGS. 2a through 7, an alternative number of POINTERs may be used for various data patterns. As another example, while an alternative embodiment to that of FIG. 8 was described above whereby each POINTER and its associated CONTROL could have its own set of stride-related values, note as still another embodiment a table could be set up with stride-related values, and that table could be referenced by one or entries in LTB 56, or even associated with one or more POINTERs from one or more entries in LTB 56. In other words, a resource pool of stride values could be shared by different LTB entries, or even by different POINTERs in one or more such entries. Still other examples will be ascertainable by one skilled in the art.

Figure 11:
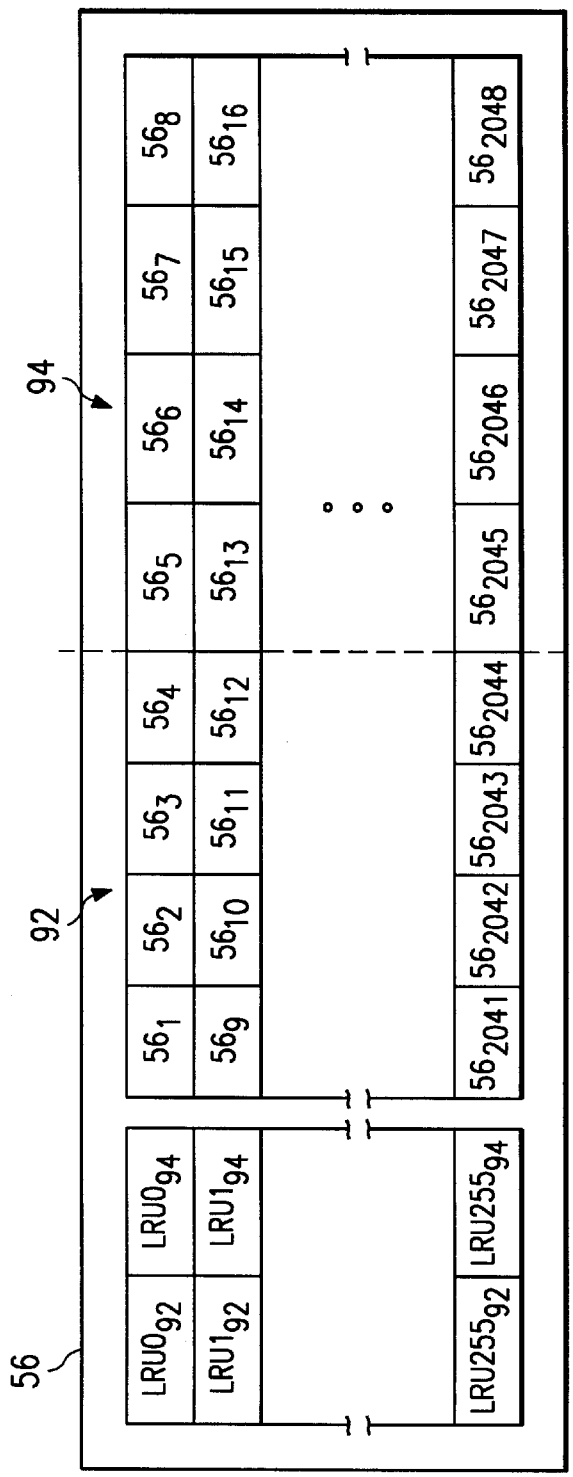
FIG. 11 illustrates an LTB having an eight-way set associate structure, where a first four of the entries of each set are a first size and a second four of the entries of each set are of a second size larger than the first size.

FIG. 11 illustrates one manner in which a load target buffer, such as LTB 56 detailed above, may be implemented. Specifically, recall it was earlier stated that LTB 56 preferably includes 2048 entries in an eight-way set associate structure. Thus, in FIG. 11, LTB 56 is shown as having 2048 entries, starting with a first entry $56_1$ and ending with a final entry $56_{2048}$. Specifically, because LTB 56 is eight-way set associative, note that each line (or "set") of LTB 56 has eight entries and, therefore, each entry corresponds to one of the eight different "ways" as that term is used in the cache art. Additionally, because each set has eight entries, then LTB 56 has a total of 256 sets to form a total of 2048 entries. Thus, each of the 2048 entries may be used to encode information about a corresponding data fetching instruction. In this regard, however, note that as a mapped associative structure such as caches and as known in the art, there is a mapping requirement of an instruction as to where it may be located in LTB 56. More specifically, a given data fetching instruction will have a corresponding address as introduced earlier. Thus, given this address, the data fetching instruction will map to only one of the 256 sets of LTB 56. Once that set is identified, the actual one of eight entries to be used in that set is determined by various principles, starting first with the LRU information described below, and then possibly also in view of other considerations provided later.

Given the configuration of LTB 56 of FIG. 11, it further introduces two additional concepts for use in still other inventive embodiments. First, some of the entries in each line of LTB 56 are longer than others. To generally illustrate this concept, a vertical dashed line is included in FIG. 11, with entries to the left of the dashed line being in a group designated generally at 92, and where the group 92 entries are shorter than entries to the right of the dashed line which are in a group designated generally at 94. Second, each set of entries has LRU information, and in the preferred embodiment that LRU information is separated according to entry size so that one LRU indicator is maintained for each group of entries having the same size for a particular set. For example, in the top set of LTB 56, there is an LRU indicator designated $LRU0_{92}$, where the "0" indicates that the LRU information corresponds to the top or 0th set of LTB 56, and where the subscript "92" indicates that the LRU information corresponds to the entries in group 92 of set 0 (i.e., entries $56_1$, $56_2$, $56_3$, and $56_4$). As another example corresponding to the top set of LTB 56, there is an LRU indicator designated $LRU0_{94}$, where again the "0" indicates that the LRU information corresponds to the top or 0th set of LTB 56, and where the subscript "94" indicates that the LRU information corresponds to the entries in group 94 of set 0 (i.e., entries $56_5$, $56_6$, $56_7$, and $56_8$). Lastly, note that despite the above separation of the LRU information into indicators per group of like-sized entries, in an alternative embodiment a single LRU indicator could be used for all entries in a set.

Looking now in detail to the varying length entries of LTB 56 of FIG. 11, recall that the group 92 entries are shorter in length than the group 94 entries. More specifically, from earlier Figures note that two different formats for entry $56_1$ have been described, namely, one in FIG. 4 and another in FIG. 8. Note further that the FIG. 8 type entry necessarily requires a larger number of bits to implement than the FIG. 4 type entry. Thus, in the embodiment of LTB 56 of FIG. 11, the group 92 entries represent the entry type shown in FIG. 4, while the group 94 entries represent the entry type shown in FIG. 8. In other words, the group 92 entries are operable to predict less complicated data pattern behavior such as looping and same address patterns, while the group 94 entries are operable to predict looping and same address patterns as well as more complicated pattern behavior such as striding or striding then looping patterns. Given the varying sized entries of LTB 56 of FIG. 11, note now various benefits it provides over an LTB having all lines of the same number of values. Specifically, note that each group 94 entry has a relatively large number of values, that is, its fifteen values is large when compared to the ten values of each group 92 entry. Thus, where a given data fetching instruction may be characterized by a group 92 entry, it is more efficient to place the information for that data fetching instruction in group 92 rather than in group 94. For example, recall from Table 1 that instruction 11 may be predicted to follow a looping pattern. Thus, if instruction 11 were placed in group 94, then the stride-related values for that line would be of no use since instruction 11 does not involve striding. In contrast, therefore, instruction 11 is preferably included as one of the entries in group 92 of FIG. 11. As a result, since instruction 11 does not then use an entry in group 94, then the entry which otherwise would be consumed by instruction 11 is free to be allocated to an instruction which will use the additional stride-related resources (e.g., instruction 23 of Table 4). In other words, considerable resources are required to form each of the values of an entry in group 94. Therefore, in the preferred embodiment, only instructions which benefit from those resources are maintained in group 94. Moreover, recall also that, when establishing entries which have stride-related values, the default prediction is that a data fetching instruction will follow a stride mode. Therefore, given this default, it is further preferable that when establishing an entry in LTB 56 for a first time, the entry is first formed in group 94. Thereafter, if the default prediction of a stride mode is determined to be inaccurate, the entry may be modified and moved to the less complex structure available in the entries of group 92. Again, therefore, this process further optimizes the use of the entries of both group 92 and group 94. Still further, note that in alternative embodiments a different default may be used, such as having a default prediction that a data fetching instruction will follow a loop mode. Therefore, given this alternative default, it would be further preferable that when establishing an entry in LTB 56 for a first time, the entry is first formed in group 92. Thereafter, if the alternative default prediction of a loop mode is determined to be inaccurate, the entry may be modified and moved to the more complex structure available in the entries of group 94. Still additional variations will depend on the different types of entries in the LTB as well as the complexity of the data pattern behavior which may be encoded in those entries and, thus, further modifications may be ascertained by one skilled in the art.

Looking now in detail to the LRU information, recall it was generally introduced earlier when discussing creation of an entry in LTB 56. However, the LRU information is expressly illustrated in FIG. 11 because, as detailed below, it may be used in conjunction with the still additional information which may be included in each LTB entry. This additional type of information is described later in connection with FIG. 12. Before discussing the additional information of FIG. 12, recall generally that the LRU information in one embodiment is preferably one factor when creating an entry in LTB 56. Specifically, after all entries corresponding to an LRU indicator are full (i.e., contain valid information), the LRU information becomes relevant as to the overwriting of one of the used entries to create a new entry in LTB 56 for the next data fetching instruction to be placed in one of those entries. For example, consider indicator $LRU0_{94}$. Once each of entries $56_5$, $56_6$, $56_7$, and $56_8$ stores valid information, then $LRU0_{92}$ provides an indication of which of those entries is the least recently used. Next, consider an example where a next data fetching instruction is received and, due to its address, it maps to the set of entries which includes entries $56_5$, $56_6$, $56_7$, and $56_8$. In other words, assume this next data fetching instruction is fetched by instruction fetch stage 40, LTB 56 is consulted to determine whether it already has an entry corresponding to it, and it is determined that none of entries $56_5$, $56_6$, $56_7$, and $56_8$ corresponds to the newly received data fetching instruction which maps to that group of entries. In other words, it is therefore , it is also determined at this point that each of the four entries $56_5$, $56_6$, $56_7$, and $56_8$ already stores information corresponding to other data fetching instructions. Thus, in a first embodiment, the LRU information corresponding to the existing entries is checked to identify which of the four entries is the least recently used. In the present example, therefore, $LRU0_{94}$ is evaluated. In response to the LRU indicator, the entry which is the least recently used is replaced by the information pertaining to the newly fetched data fetching instruction. This replacement may occur by merely overwriting the information corresponding to the least recently used data fetching instruction, or by first evicting it to some secondary store and then creating a new entry in its place. A second and alternative embodiment, however, is detailed later following the introduction of two additional values in FIG. 12, where that alternative embodiment permits the LRU information to be used in the manner as described above in some instances but, based on the additional values, may further permit an entry other than the least recently used to be overwritten.

Figure 12:
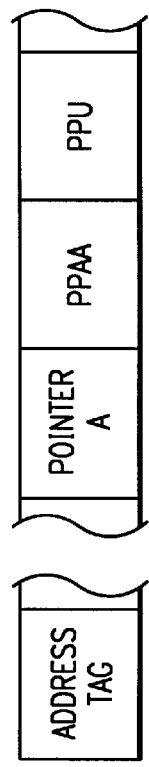
FIG. 12 illustrates an LTB entry having two values relating to the desirability of issuing a prefetch request for the instruction identified by the entry, where the two values include a PPAA value indicating past predicted address accuracy and a PPU value indicating past prefetch usefulness.

FIG. 12 illustrates additional values which my be included within entry $56_1$ of either FIG. 4 or FIG. 8, or still other types of LTB entries as well. Thus, entry $56_1$ of FIG. 12 may include various of the same values as in either FIG. 4 or FIG. 8 shown above, but only two of the already-described values are shown to simplify the Figure. Regarding the already-described values in entry $56_1$ of FIG. 12, it includes the ADDRESS TAG and the POINTER A. The ADDRESS TAG in FIG. 12 is the same as detailed above. With respect to the POINTER A, note again that it represents a value which predicts the target data address for a given data fetching instruction However, as further appreciated below, many of the aspects described in connection with FIG. 12 may apply to an LTB entry having a single POINTER as well as multiple POINTERs and, therefore, entry $56_1$ of FIG. 12 does not include a B POINT or a C POINTER as do various embodiments described earlier. Regarding the newly-shown values in entry $56_1$ of FIG. 12, they include a past predicted address accuracy value abbreviated PPAA and a past prefetch usefulness value abbreviated PPU. Each of these newly-shown values is detailed below.

Looking to the PPAA value shown in FIG. 12, it indicates a past predicted address accuracy measure for past incidents of the corresponding data fetching instruction in LTB 56. In other words, note from the many examples provided above that each valid POINTER in an entry of LTB 56 predicts a target data address for a corresponding data fetching instruction and, based upon the potential remaining considerations of an entry (e.g., the NEXT POINTER and the CONTROL corresponding to a POINTER) a prefetch request is issued which includes the predicted target data address. In response to this prefetch request, and if the predicted data is not already on-chip, a prefetch operation typically takes place, absent some other intervention such as the operation of access controller 22 to prevent or otherwise modify the prefetch operation based on various system parameters. If the prefetch operation takes place, recall that the prefetched information is brought on-chip to some storage resource, such as to a cache or prefetch buffer. Thereafter, once the data fetching instruction is sufficiently through pipeline 38, an actual target data address is determined and a fetch for the data at the actual target data address takes place. Therefore, if the prediction from the appropriate entry of LTB 56 is accurate, then the data earlier prefetched now may be fetched from the on-chip storage resource. Summarizing these operations for the current context, note therefore that the processing of a data fetching instruction through pipeline 38 generates both a predicted target data address from LTB 56 and an actual target data address as the data fetching instruction progresses through pipeline 38. Having access to both of these two addresses for a given data fetching instruction, the present embodiment compares the two to create a value for PPAA. Specifically, if the two addresses match, then the most recent prediction of the entry in LTB 56 is accurate; conversely, if the two addresses do not match, then the most recent prediction of the entry in LTB 56 is inaccurate. These findings may be encoded and updated in PPAA in various manners, where the following represents a few preferred techniques.

As a first example of encoding the value of PPAA, note from the preceding paragraph that sufficient information is available to compare the predicted target data address and the actual target data address for a given incident of a data fetching instruction. Thus, in one embodiment, PPAA is a count which advances in a first direction in response to an accurate prediction by the predicted address value, where the count advances in a second direction opposite the first direction in response to an inaccurate prediction by the predicted address value. For example, the first direction may be incrementing such that the counter is incremented each time the compared target data addresses match and, therefore, the second direction is decrementing such that counter is decremented each time the compared target data addresses do not match. Consequently, the higher the count of PPAA, the more accurate the predictions recently have been for the corresponding data fetching instruction. Moreover, the greater the number of bits in the count, the greater the resolution in its indication. Indeed, other references exist to counting branch predictors, such as in "Combining Branch Predictors", by Scott McFarling available from the Western Research laboratory ("WRL"), Technical Note TN-36, June 1993, which is hereby incorporated herein by reference. In the preferred embodiment, a five-bit count is used so the count may reflect up to thirty-two successive correct or incorrect predictions. Moreover, note further that the count is preferably first established at the same time the entry is created in LTB 56 for a given data fetching instruction, and that the initial value of the count is set at some mid-range between its extremes. Thus, for the example of a five-bit counter, its extremes are 0 to 31, so it preferably is initialized to a value of 15 (i.e., binary 01111) or 16 (i.e., binary 10000). Note that by initializing the count to a mid-range in this manner, its initial indication does not favor either one extreme or the other, that is, at that point the PPAA does not wrongfully suggest that there have been past incidents of either proper or improper prediction. Instead, the immediately following incidents of the corresponding data fetching instruction are able to change the count value toward an indication of either proper or improper prediction by either incrementing or decrementing the count as described above.

As a second example of encoding the value of PPAA, note also that the PPAA value may record the past determinations of whether the predicted target data address and the actual target data address match as a sequential history. For example, a six-bit PPAA field could demonstrate in time fashion the last six states of the comparison between these two addresses. Thus, if four occurrences of an inaccurate prediction were followed by two occurrences of an accurate prediction, and if accuracy were indicated by a logic high signal, then the six-bit PPAA field would indicate 000011. Thus, a field with more 1's than 0's would indicate a higher recent incidence of accurate prediction.

The above presents two embodiments for encoding the value of PPAA. Note, however, that various additional implementations may be ascertained by a person skilled in the art given the current teachings. Additionally, note also that the use of the single PPAA value shown in connection with entry $56_1$ is only by way of example of one embodiment In connection with an alternative, recall that entry $56_1$ may include three POINTERs. Thus, in an alternative embodiment, each of the three POINTERs could have a corresponding PPAA value, where that corresponding PPAA value represented the past predicted address accuracy for the corresponding POINTER In this alternative, it also is preferable to reduce the number of indications required. For example, where a five-bit counter is discussed above in connection with the first encoding technique for PPAA, a lesser value such as a four-bit or a three-bit counter is preferably used if separate values of PPAA are initialized and maintained for each separate POINTER. As another example of an alternative, note that the use of a PPAA value in connection with an LTB need not be limited to the type of LTB described above. In other words, it is shown above how LTB 56 may predict a same address mode, a loop mode, a stride mode, a combined stride-then-loop mode, and still other data patterns as ascertainable by a person skilled in the art Nevertheless, many of the concepts described herein as applying to the PPAA value may apply to other LTBs as well.

Looking now to the PPU value shown in FIG. 12, it indicates the past prefetch usefulness of the corresponding data fetching instruction in response to determining the location of the predicted target data before prefetching. In other words, note from the many examples provided above that when a prefetch request is issued, the prefetched data may be stored at various levels. For example, in microprocessor 12 of FIG. 1, recall that the prefetch request is first issued to L2 unified cache 20 to determine whether the requested target data is stored there. Moreover, in the preferred embodiment, if a hit occurs in L2 unified cache 20, then no prefetch operation occurs. On the other hand, if a miss occurs in L2 unified cache 20 then, absent some other consideration, the data from the predicted target data address is prefetched (i.e., retrieved) into L2 unified cache 20 from some off-chip resource, such as an external cache, main memory 14, or the on-chip memory from another microprocessor. Simplifying the above, note that in response to a prefetch request, the preferred embodiment determines whether the predicted target data is either on-chip or off-chip. Also in the preferred embodiment, only when the predicted target data is off-chip does the additional prefetch operation take place. In other words, if the predicted target data address is off-chip, the present inventors have deemed it is useful to prefetch the data to an on-chip resource so that it later may be fetched when the data fetching instruction passes further into pipeline 38. Conversely, if the predicted target data address is already on-chip (e.g., in L2 unified cache 20), then the already on-chip data thereafter may be fetched from the on-chip storage resource when the data fetching instruction passes further into pipeline 38. Thus, in this latter instance, an additional prefetch operation is deemed not to be useful because the data is already on-chip. Summarizing the above, a prefetch operation for one incident of a data fetching instruction may be useful (i.e., where the predicted target data address is off-chip) while a prefetch operation for another incident of the data fetching instruction is not necessarily useful. Given these two possibilities, PPU maintains a history of this usefulness for successive incidents of a data fetching instruction, and the value of PPU may be encoded and updated in various manners, where the following represents a few preferred techniques.

As a first example of encoding the value of PPU, note that it may be embodied in a counter in a manner similar to the value of PPAA discussed above. Thus, in one embodiment, PPU is also a count, and it advances in a first direction in response to a useful prefetch (e.g., one where the predicted target data is off-chip), while it advances in a second direction opposite the first direction in response to a prefetch which is deemed not useful (e.g., one where the predicted target data is on-chip). Again, therefore, by way of example, the first direction may be incrementing such that the counter is incremented each time the predicted target data is off-chip and, therefore, the second direction is decrementing such that counter is decremented each time the predicted target data is on-chip. Consequently, the higher the count of PPU, the more useful prefetching has been based on the recent predictions for the corresponding data fetching instruction. Moreover, the greater the number of bits in the count, the greater the resolution in its indication. In the preferred embodiment, a five-bit count is used so the count may reflect up to thirty-two successive useful or not useful prefetch events corresponding to successive incidents of the data fetching instruction Moreover, again the count is preferably first established at the same time the entry is created in LTB 56 for a given data fetching instruction, and that the initial value of the count is set at some mid-range between its extremes so that count does not favor either one extreme or the other.

As a second example of encoding the value of PPU, note that it may be embodied in a history sequence also similar to the value of PPAA discussed above. In the instance of PPU, therefore, the history sequence would reflect the past determinations of whether the prefetch was useful. For example, a six-bit PPU field could demonstrate in time fashion the last six states of the determination. Thus, if four occurrences of a prediction of data which were prefetched from off-chip were followed by two occurrences of a prediction of data found to be on-chip, then the six-bit PPU field would indicate 111100. Thus, a field with more 1's than 0's would indicate a higher recent incidence of off-chip prefetched data.

While the above presents two embodiments for encoding the value of PPU, note that various additional implementations may be ascertained by a person skilled in the art given the current teachings. For example, the above discussion adjusts PPU based on only two states, that is, whether the predicted data is on-chip or off-chip. However, an alternative embodiment may present more information about where the data is located. Thus, a different code could be attributed to different locations, such as in which on-chip storage the data is found or in which off-chip storage the data is found. Moreover, as was the case with the value of PPAA, the value of PPU may be implemented with an entry $56_1$ having three POINTERs such that each of the three POINTERs could have a corresponding PPU, where that corresponding PPU value represented the past prefetch usefulness for the data identified by the corresponding POINTER. As another example of an alternative, the use of a PPU value in connection with an LTB need not be limited to the type of LTB described above.

Having presented various considerations of the PPAA and PPU values of FIG. 12, note that the present inventors contemplate various uses of those values, where those uses may be of each value separately or in combination with one another. Note that three such uses of these values are presented herein, each of which is briefly introduced here. A first use of the PPAA and PPU values is in connection with evaluating the LRU information to govern which entry in LTB 56 is overwritten once all entries in the relevant LTB set to which a next entry is mapped are full. A second use of the PPAA and PPU values is for locating the entry in an LTB 56 where that LTB is configured to have different sized line entries based on prefetch desirability. A third use of the PPAA and PPU values is as a system parameter to be considered by prefetch controller 22 of FIG. 1.

Figure 13A:
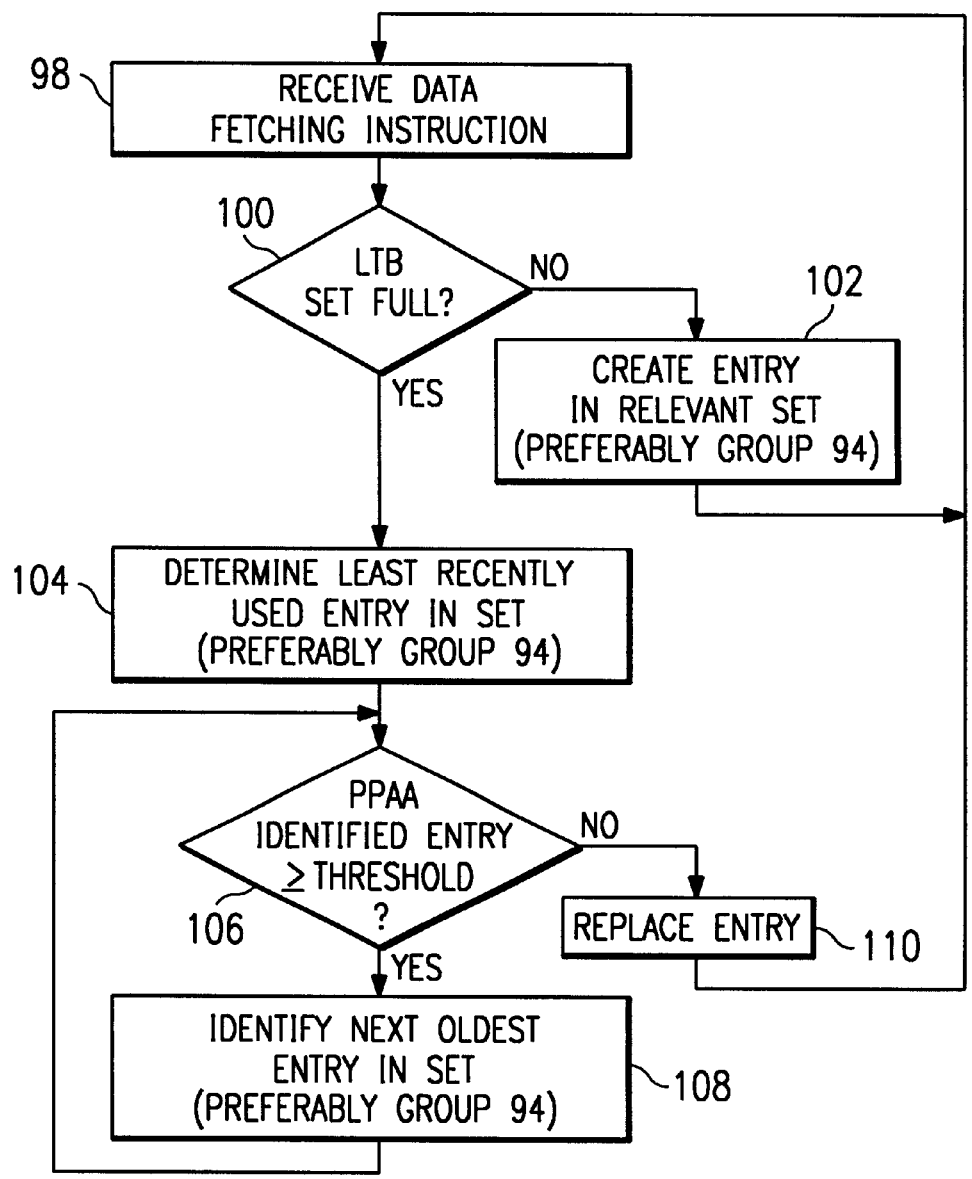
FIG. 13a illustrates a flowchart for a method to overwrite an LTB entry based on its LRU and PPAA values.

A first use of the PPAA value is in connection with evaluating the LRU information to govern which entry in LTB 56 is overwritten if all entries in a group of liked-sized entries in a set of LTB 56 are full, and is shown generally by method 96a of FIG. 13a. Method 96a begins with a step 98 where pipeline 38 receives an instruction and detects that it is a data fetching instruction. In response, step 100 evaluates the set in LTB 56 to which the received data fetching instruction is mapped according to the address of that instruction, and further determines whether all entries in that set are full. Still further, step 100 may be refined further where, as in the preferred embodiment, a set has groups of entries where each group is distinguishable because its entries are of one size where entries of a different group in the same set are a different size. Given this refinement, step 100 only analyzes the entries in the group or groups in which it is desired to possibly encode information corresponding to the received data fetching instruction. For example, recall above it is stated that, in the preferred embodiment, an entry for a data fetching instruction is first created in the longer entries of LTB 56, that is, those which include stride-related fields. Thus, in this context, in step 100 the set to which the received data fetching instruction maps is first identified, and then it is determined whether each of the group 94 entries for that set are full. If not, then method 96a continues to step 102 whereas, if so, method 96a continues to step 104.

Step 102 creates an entry corresponding to the current data fetching instruction in one of the available entries of the appropriate set of LTB 56. For example, once the appropriate set is identified, then if LTB 56 takes the form of that shown in FIG. 11 the new entry is preferably created in group 94 and later may be converted to a group 92 entry if the less complex prediction values in a group 92 entry may be used. On the other hand, if all entries in the relevant LTB are of the same size, then step 102 creates an entry in any of the available entries for the appropriate set. Note that the actual selection of one of the available entries may be by various placement algorithms, such as by random selection or according to the address of the available entries (e.g., by choosing the available entry with either the highest or lowest address). In any event, once step 102 creates its entry, method 96a returns to step 98 and awaits the next data fetching instruction.

Step 104 is reached after a data fetching instruction is received and it is determined (by step 100) that all entries of the appropriate LTB set (I.e., the set to which the address of the data fetching instruction maps) are full. Step 104 then reviews the LRU indicator for this appropriate set. Again, if LTB 56 takes the form of that shown in FIG. 11, then preferably the review is only of the group 94 LRU indicator because it is favorable to replace one of the group 94 entries before replacing one of the group 92 entries. For example, if the received data fetching instruction maps to set 0 of LTB 56, then the $LRU0_{94}$ indicator is reviewed to determine which of entries $56_5$, $56_6$, $56_7$, or $56_8$ is the least recently used. On the other hand, if all entries in the relevant LTB are of the same size, then step 104 merely identifies which of the same-sized LTB entries in the selected set is the least recently used. Next, method 96a continues to step 106.

Step 106 determines whether the PPAA value of the entry identified in step 106 is greater than some threshold. In other words, one skilled in the art will now appreciate that PPAA above provides an indication for each entry in LTB 56 of the success of past predictions for that entry. Therefore, as an alternative to relying solely on the LRU information to overwrite an entry in LTB 56, a PPAA indicating highly accurate predictions may effectively override the effect of the LRU information using the remaining steps of method 96a. In other words, if an entry in LTB 56 has been highly predictable, then even though that entry is the least recently used it still may be worthwhile to retain it in LTB 56. For example, in the counter embodiment of PPAA provided above, a relatively large count indicates a past history of successful predictions. More specifically, in the example of a five-bit counter, a count threshold on the order of 11100 is likely to suggest considerably successful past predictions with respect to the entry in LTB 56 corresponding to that count. Naturally, this threshold may be adjusted by one skilled in the art. In any event, in the method embodiment of FIG. 13a, if the PPAA of the identified entry is greater than or equal to the desired threshold, method 96a continues to step 108. On the other hand, if the PPAA of the identified entry is less than the desired threshold, method 96a continues to step 110.

Step 108, having been reached because the PPAA of the earlier-identified entry is relatively high, again considers the LRU indicator of the same set considered in step 104 to identify the least recently used entry in that set, but does not consider any of the preceding entries which were already identified but which also were found to have a corresponding PPAA value exceeding the threshold of step 106. Moreover, like step 104, if LTB 56 of FIG. 11 is at issue, the consideration of step 108 is initially only of entries in group 94. In any event, one skilled in the art will appreciate that steps 106 and 108 will continue in repeating fashion until an entry is identified in the group of the relevant set in LTB 56 which not only has a relatively old LRU indication, but also which has a value of PPAA which is below the threshold of step 106. Alternatively, although not expressly shown in FIG. 13a, note further that if step 106 determines that each of the entries in the group have a PPAA value greater than or equal to the threshold of step 106, then in the preferred embodiment the entry with the lowest PPAA value is identified for further action. Still further, step 106 is still further modified such that if each of the entries in the group being considered have a PPAA value greater than or equal to the threshold of step 106, and the lowest PPAA value is shared by two or more entries, then the one of those sharing entries which is the least recently used of those entries is identified for further action. Once the identification of an entry by step 108 occurs, method 96a continues to step 110.

Step 110 creates a new entry corresponding to the received data fetching instruction by overwriting the entry which is identified by one or more iterations of step 106, and therefore typically overwrites the entry in LTB 56 which has a relatively old LRU indication and further has a value of PPAA which is below the threshold of step 106 (although, as explained in the preceding paragraph, in some instances all entries may have a PPAA value greater than or equal to the threshold, in which case one of those entries is identified by some alternate technique). Once step 110 creates its entry, method 96a returns to step 98 and awaits the next data fetching instruction.

Given the above, one skilled in the art will appreciate that method 96a effectively maintains the more successfully predicted data fetching instructions in LTB 56. Thus, these predictions are retained so that those data fetching instructions are more readily processed for future incidents of those inductions. Moreover, there is a reduction in the necessity to repeat the procedures for having to reestablish the information (e.g., POINTERs, CONTROL, etc.) with respect to those instructions, where such procedures were shown by way of example following the respective discussion of FIGS. 4 and 8, above.

Having described method 96a of FIG. 13a, note further that still another embodiment may be implemented by replacing the PPAA value of step 106 with the PPU value described above. Thus, without restating the detail set forth above, one skilled in the art will appreciate that such an alternative approach would permit the PPU value to effectively override the effect of using the LRU information as a sole criterion to overwrite entries in LTB 56. In other words, in this alternative approach, once a set in LTB 56 is full (or all of the same group entries in a set are full), the oldest entry would not be overwritten if its PPU value exceeded a given threshold. For example, in the example of a five-bit counter, a count threshold on the order of 11100 is likely to suggest considerably strong usefulness of prefetching with respect to the entry in LTB 56 corresponding to that count. Thus, by using method 96a in connection with PPU rather than PPA, such an entry would remain in LTB 56 and, instead, a relatively old entry with a lower PPU indication would be overwritten by the entry corresponding to the newly received data fetching instruction.

As still another alternative, note another embodiment may arise using the method 96a of FIG. 13a, but where the comparison of step 106 is based on both the PPAA and PPU values. In other words, given the information provided by PPU, it may be further combined in a function with the value of PPAA to be measured against a threshold in step 106. For example, suppose for the least recently used entry in LTB 56 that its PPAA value was relatively low, yet its PPU value was relatively high. Thus, when combined, the large PPU value may still justify maintaining the entry despite its low PPAA value. Thus, based on this combination, such an entry may be maintained in LTB 56 and, instead, a different entry having a combined PPAA and PPU below the threshold would be overwritten. Lastly, note that the considerations for combining PPAA and PPU in this regard need not be limited and may be ascertained by a person skilled in the art Nevertheless, as one example of an embodiment, note that the average of the PPAA and PPU values could be calculated and compared against a threshold if the PPAA and PPU values are each embodied as a count as described above. For example, if each value is a count between 0 and 31, the two counts could be added with the sum divided by two and compared to a threshold. Indeed, to avoid any division, the sum could instead be compared to a value which is twice the threshold mentioned immediately above. Note further, however, that a more complicated function to combine the PPAA and PPU values may be implemented. For example, recall above it was noted that a high PPU combined with a low PPAA may still justify maintaining an entry in LTB 56. However, note further now that a high PPAA combined with a low PPU may not justify maintaining an entry in LTB 56. Thus, the averaging technique described above would not reach the proper result for this latter possibility because an average by itself would reach the same result for either: (1) a high PPU and a low PPAA or (2) a low PPU and a high PPAA. Thus, one skilled in the art will appreciate that a different function of combining the PPU and PPAA values may be desired where a different result is required based on the relative size of those two values. Still further approaches will be ascertainable by one skilled in the art.

Figure 13B:
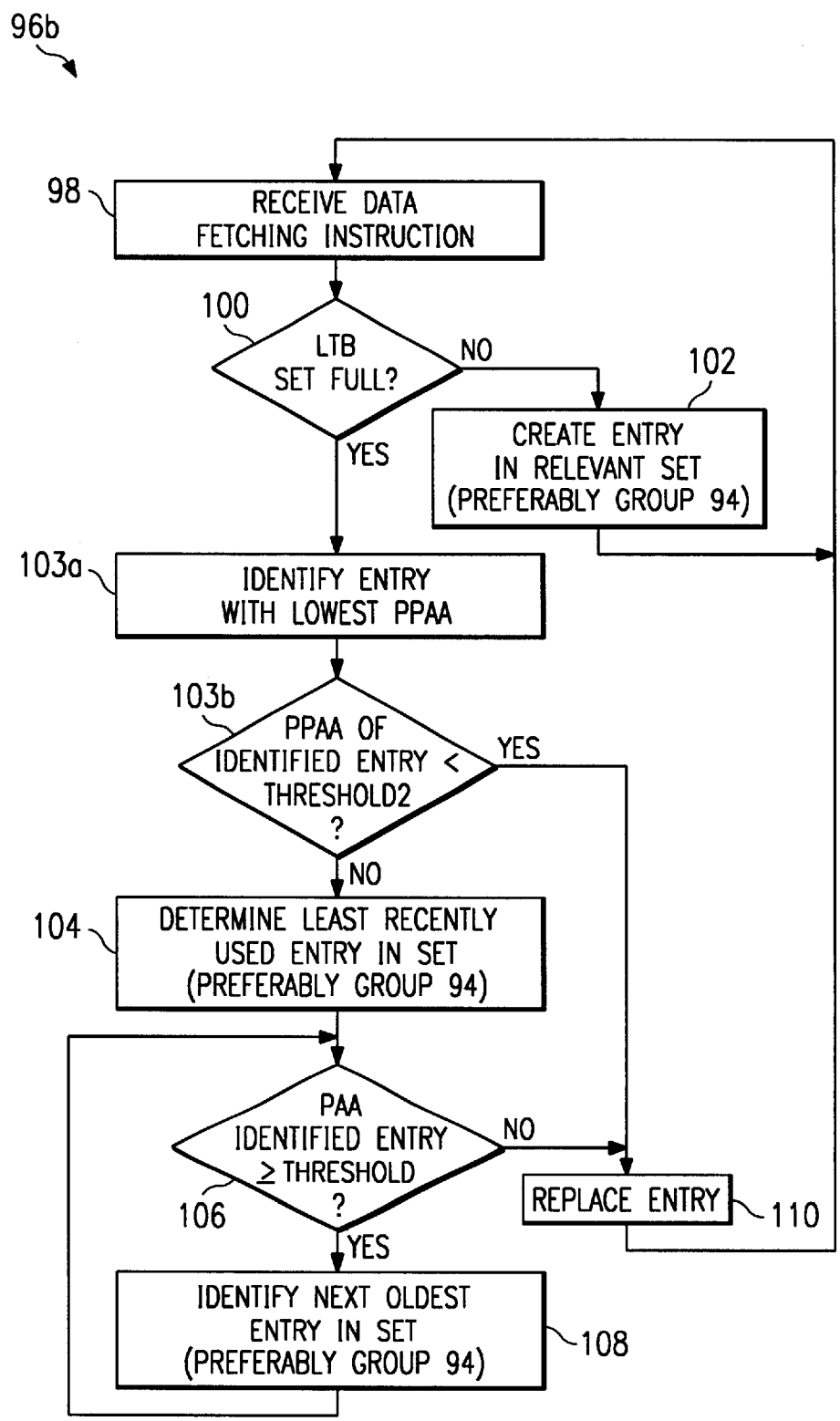
FIG. 13b illustrates a modification to the flowchart for the method of FIG. 13a, where the modification may also overwrite an LTB entry based on relatively low PPAA value.

FIG. 13b illustrates a modification to the flowchart for the method of FIG. 13a, where the modification also may overwrite an LTB entry, but the additional steps of FIG. 13b permit overwriting the entry regardless of the LRU information as demonstrated below. Looking to FIG. 13b, it includes each of the same steps as method 96a of FIG. 13a and, thus, the reference numerals from FIG. 13a are carried forward to FIG. 13b. To distinguish the overall methods, however, the method of FIG. 13b is designated at 96b. Moreover, note that method 96b includes two steps in addition to the method 96a steps. Specifically, steps 103a and 103b are inserted after step 100. Each of these newly-added steps is described below.

Step 103a, having been reached because a group of entries are all full as determined by step 100, identifies the entry with the lowest PPAA value. Again, in an alternative embodiment, step 103a could identify the entry with the lowest PPU value, and in still another alternative, step 103a could identify the entry with the lowest combined PPAA and PPU values. Once this entry is identified, step 103b determines whether the value(s) used in step 103a (ie., PPAA, PPU, or a combination of the two) is below some threshold, which is indicated as THRESHOLD2 in FIG. 13b. For reasons clearer below, note that THRESHOLD2 will be relatively low as compared to the THRESHOLD used in step 106. If the value(s) at issue is less than THRESHOLD2, then method 96b continues to step 110. As mentioned above in connection with FIG. 13, step 110 then overwrites the identified entry. In the current example, therefore, the entry which is overwritten is one which had a PPAA, PPU, or combined PPAA and PPU which is below THRESHOLD2. On the other hand, if the value(s) at issue in step 103b are at or above THRESHOLD2, then the method continues to step 104 and forward in the same manner as in FIG. 13a, described above.

Given the additional steps 103a and 103b of FIG. 13b, one skilled in the art will appreciate that the additional consideration of steps 103a and 103b may potentially identify an entry for which it is of little value to retain it in the LTB because of its poor predictability and/or lack of usefulness to issue a prefetch. Thus, the value of PPAA and/or PPU may be used as a complete alternative to relying on the LRU information to overwrite an entry in LTB 56. In other words, if an entry in LTB 56 has been poorly predictable or it has not been beneficial to issue a prefetch request for it, then regardless of when that entry was last used it may not be worthwhile to retain it in LTB 56. For example, in the counter embodiment of PPAA provided above, a relatively low count indicates a past history of unsuccessful predictions. More specifically, in the example of a five-bit counter, a count threshold on the order of 00100 is likely to suggest considerably unsuccessful past predictions with respect to the entry in LTB 56 corresponding to that count. Similar considerations with respect to the values of PPU and a function combining PPAA and PPU may be ascertained by one skilled in the art. In any event, therefore, the entry with poor predictability and/or lack of prefetch usefulness is evicted in favor of a newly created entry, and regardless of when the evicted entry was last used while in the LTB.

A second use of either of the PPAA or PPU values alone, or of those two values in combination, is for locating the corresponding entry in an LTB where that LTB is configured to have different sized line entries based on prefetch desirability. In this regard, FIG. 14 illustrates a block diagram of an alternative configuration for an LTB designated generally at 112, where this alternative configuration again has 2048 entries arranged across eight-sets and 256 lines, and again has entries grouped according to different sizes, both as in the manner of FIG. 11. However, note that LTB 112 of FIG. 14 includes three groups rather than two as shown in FIG. 11. Groups 116 and 118 are similar to groups 92 and 94 of LTB 56 of FIG. 11. Specifically, it is intended in FIG. 14 to suggest that each entry in group 116 is of the type of entry $56_1$ shown in FIG. 4 (ie., loop mode type entry), while each entry in group 118 is of the type of entry $56_1$ shown in FIG. 8 (i.e., stride then loop mode type entry). Therefore, groups 16 and 118 differ from one another in that the data fetch pattern behavior differs for those two groups. Note further that because each line still has a total of eight entries, and further because group 114 has four entries per line, then each line within groups 116 and 118 only include two entries each rather than four entries as shown in FIG. 11. Each entry in group 114 is detailed below in connection with FIG. 15.

FIG. 15 illustrates a single entry $114_n$ which represents the format of all entries in group 114 of FIG. 14. In the preferred embodiment, entry $114_n$ includes only two values. The first value is the same as that of entry $56_1$ shown in either FIG. 4 or FIG. 8 and, therefore, is an ADDRESS TAG which relates the entry to the address of where the data fetching instruction is stored in memory. The second value is an UNDESIRABLE PREFETCH INDICATOR. The UNDESIRABLE PREFETCH INDICATOR represents that the data fetching instruction corresponding to entry $114_n$ has been determined to be undesirable with respect to a prefetch operation, that is, for one or more reasons, the data fetching instruction already has been analyzed and it has been determined that no prefetch request should be made in connection with that data fetching instruction. More specifically, note now that it may be undesirable to issue a prefetch request based on either the PPAA value, the PPU value, or a combination of both. For example, above there are described various techniques for detecting a pattern of data fetches by a data fetching instruction and, from that pattern, predicting the next target data address for the data fetching instruction. However, due to the numerous possibilities of data patterns, and also due to the fact that some data fetching instructions do not fetch according to any pattern, the next target data address for certain data fetching instructions will not be predictable. Indeed, this may be true for many data fetching instructions. Thus, after these types of instructions have been incurred over several incidents, an entry should be formed for each in the LTB but that entry will have a low PPAA value. Thus, when PPAA for a certain data fetching instruction reaches or falls below a certain threshold, then it may be concluded for that instruction that it is unpredictable. For example, in the embodiment above where a five-bit counter is used to indicate PPAA, a threshold count on the order of 00100 is likely to suggest that the corresponding data fetching instruction is unpredictable. Once again the actual threshold number of counts or other measure of PPAA may be altered by one skilled in the art. In any event, once a given data fetching instruction is deemed to be unpredictable, it is therefore deemed that it is undesirable to thereafter issue prefetch requests for that instruction for still further incidents of that instruction, while the already-existing entry for that instruction in either group 116 or 118 is invalidated. Thus, upon reaching this threshold, an entry in group 114 is then formed for that data fetching instruction. Note also that prefetch undesirability also may be reached as a result of PPU. In other words, for a given instruction, after it has been incurred over several incidents, an entry may be formed for it in the LTB where that entry has a low PPU value. Thus, when PPU for that data fetching instruction reaches or falls below a certain threshold, then it may be concluded that, regardless of its predictability, the data is often on-chip and, for that reason, again it is undesirable to repeatedly issue prefetch requests for that instruction. Again, the threshold may be evaluated based on the technique used to encode PPU, such as comparing a counter to some predetermined number. In any event, once a given data fetching instruction is deemed to rarely benefit from a prefetch request because its data is often on chip, an alternative embodiment may deem that it is undesirable to thereafter issue prefetch requests for that instruction for still further incidents of that instruction. Thus, upon reaching this threshold, an entry in group 114 is then formed for that data fetching instruction, again while the already-existing entry for that instruction in either group 116 or 118 is invalidated. Lastly, rather than using either PPAA or PPU individually, once again a combination of both PPAA and PPU also may be formed to evaluate the merit of issuing a prefetch request for a given data fetching instruction. Thus, upon establishing a threshold based on the function which combines these values, certain data fetching instruction may be identified as those for which prefetch requests are undesirable an, again, an entry in group 114 is then formed for those data fetching instructions, while the already-existing entry for that instruction in either group 116 or 118 is invalidated.

Returning to LTB 112 of FIG. 14, note now various benefits it provides over an LTB having all lines of the same number of values. First, note that LTB 112 enjoys many of the benefits provided by LTB 56 of FIG. 11. In other words, once again it is more efficient to place the information for a data fetching instruction in group 116 rather than group 118. However, beyond this aspect, when appropriate note that it is further beneficial to place an entry in group 114 rather than in either group 116 or group 118. Specifically, note that each entry of both group 116 and group 118 has a relatively large number of values when compared to the two values of the entries in group 114. Thus, where a given data fetching instruction may be characterized by an entry in group 114, it is more efficient to place the information for that data fetching instruction in group 114 rather than in group 116 or group 118. For example, it may be undesirable to issue a prefetch request for many frequently incurred data fetching instructions. Initially, therefore, an entry may be created for each such data fetching instruction in group 116 or group 118. However, once the PPA, PPU, or function combining PPAA and PPU, for such a fetching instruction reaches an appropriate threshold, then that entry may be invalidated and a new entry may be created for that data fetching instruction in group 114. Thereafter, when the data fetching instruction is fetched by instruction fetch stage 40, LTB 112 is consulted and a hit will occur in group 114, thereby indicating that the data fetching instruction has earlier been found to be one for which a prefetch is undesirable. Thus, no additional prediction resources need be used as to the data fetching instruction and it may remain in group 114. Further, in a manner similar to the contrast of group 116 and group 118 presented above, here again the beneficial additional values of an entry in either group 116 or group 118 are not consumed by a data fetching instruction for which a prefetch request is undesirable and, instead, those resources are left available to characterize a predictable data fetching instruction.

Note also from above that an instruction may move between groups in LTB 112. For example, a data fetching instruction may initially be placed in group 118 as an initial prediction that the instruction will follow a striding pattern. However, if thereafter it is determined that the instruction may follow a less complicated pattern, it may then be moved to group 116. Lastly, if it is still further determined that the data fetching instruction is unpredictable or often results in chip hits for predicted data, it may then be moved to group 114. Again, therefore, the resources provided by LTB 112 as a whole are maximized.

Note also that LTB 112 may be modified in various regards to form still additional embodiments. For example, while LTB 112 is depicted as a singular structure, each of groups 114, 116, and 118 may be formed as separate structures. Note further that while groups 116 and 118 are of particular predictability types (i.e., loop, and stride then loop, respectively), group 114 may be combined with other types of LTB entries such that a first group of data fetching instructions are provided for which prefetch requests are undesirable (i.e., group 114), and a second group is also provided but the data fetching instructions of the second group are predictable in either common manners (e.g., looping), or manners which differ among the second group (i.e., some instructions within the second group are looping while others are striding then looping). Still further, while the examples of looping or striding then looping are provided here, still additional types of predictability patterns may be combined in any of the above manners. For example, a group may be included where each data fetching instruction in the group is merely a striding pattern instruction (i.e., without looping or some other attribute). One skilled in the art may ascertain yet additional types of patterns as well. In any event, the data fetching instructions for which prefetching is undesirable are separately identified from those for which prefetching is desired. Indeed, because of this separate nature, note further that the UNDESIRABLE PREFETCH INDICATOR shown in FIG. 15 is not necessarily a value in each entry of group 114, but may be a known attribute of each entry in group 114. In other words, the indications that a prefetch request is undesirable for a given data fetching may be known merely by virtue of an entry being located in group 114. In other words, a separate UNDESIRABLE PREFETCH INDICATOR is not necessary if sufficient control is implemented to indicate that, if an entry is located in a certain group (e.g., group 114), then that entry is by definition one for which a prefetch request is undesirable and should not be issued.

A third use of either of the PPAA or PPU values alone, or of those two values in combination, is as a system parameter to be considered by prefetch controller 22 of FIG. 1. Specifically, the above-referenced U.S. Patent application Ser. No. 08/999,091, entitled "Circuits, Systems, And Methods For Prefetch Handling In A Microprocessor-Based System" (Attorney Docket Number TI-24153), details in its FIG. 3 a prefetch service block 80 which may be include as part of access controller 22 shown in FIG. 1 above, The prefetch service block 80 receives prefetch requests. In response to the received prefetch request as well as various system parameters, access controller 22 may then either suppress the prefetch request by not instigating a prefetch operation, or may instigate a data prefetch operation into an on-chip cache where the prefetched data is either the same or a different size than requested by the prefetch request. Given this operation, various system parameters are presented in the incorporated patent application which may affect whether a prefetch operation is instigated in response to the prefetch request. In addition to the parameters described therein, note now that yet an additional system parameter may be the PPAA value, the PPU value, or a function combining both of those values. For example, if an LTB entry has not been very predictable, then even though a prefetch request is issued in response to the corresponding data fetching instruction it may not be worthwhile to instigate a prefetch operation in response to that prefetch request More specifically, in the example of a five-bit counter, a threshold count on the order of 01000 is likely to suggest considerably unsuccessful past predictions with respect to the LTB entry corresponding to that count. Thus, where the count is 00111 or lower, the access controller 22 may suppress the prefetch request by not instigating a prefetch operation in response to that request For this purpose, again the actual threshold number of counts or other measure of PPAA may be altered by one skilled in the art.

As suggested above, the principles described in the immediately preceding paragraph also may be modified by one skilled in the art to accommodate either the PPU value or a combination of the PPAA and PPU values. Indeed, as one approach to combining the PPAA and PPU values to provide an indication to access controller 22 (or as may be performed by access controller 22 itself), FIG. 16 illustrates a programmable table 120 for receiving the PPAA and PPU values and outputting a prefetch code based on those two values, where programmable table 120 is located somewhere on microprocessor 12. Specifically, recall that embodiments were earlier provided whereby both PPAA and PPU were encoded by keeping a history of six of the past incidents of each value. Thus, for each occurrence of a data fetching instruction, there will be a corresponding PPAA and PPU value. In FIG. 16, each of these values combine to form a pair of values. For example, the pair designated [$PPAA_1$, $PPU_1$] is intended to represent the least recent stored pair, while the pair designated [$PPAA_2,PPU_2$] is intended to represent the pair coming in time after the least recent stored pair, and so forth through the sixth pair designated [$PPAA_6$, $PPU_6$]. Given six pairs of bits in this fashion, the total 12 bit sequence is used as an address to programmable table 120. Moreover, given that the values of PPAA and PPU may differ for any given incident of a data fetching instruction, there are a total of $2^{12}$ possible combinations of the values of PPAA and PPU over six successive pairs of those values. Thus, programmable table 120 includes 4096 (i.e., $2^{12}$) different addressable locations, where each location stores a prefetch code as described below.

The prefetch code provides an indication of whether a prefetch operation is desirable given the combined sequence of the PPAA and PPU values as represented by the 12-bit input As detailed below, note also that the prefetch code output in response to a first instance of an input sequence may be changed so that a different output code is output in response to a second instance of the same input sequence. In this latter capacity, note that programmable table 120 is referred to as programmable because the output prefetch code corresponding to any of the 4096 bit combinations may be changed during operation of microprocessor 12. Table 6 below depicts the four possible prefetch codes and is followed by a discussion of the interpretation and effect of those codes.

TABLE 6

| Prefetch Code | Prefetch operation desireable? | Next prefetch code if f{PPAA, PPU} ≧ threshold | Next prefetch code if f{PPAA, PPU} < threshold |
|---|---|---|---|
| 00 | yes | 00 | 01 |
| 01 | yes | 00 | 10 |
| 10 | no | 01 | 11 |
| 11 | no | 10 | 11 |

Table 6 demonstrates whether a prefetch operation is desirable for a given prefetch code, and further whether that code should be changed based on a current incident of a data fetching instruction. For example, suppose that [$PPAA_1$, $PPU_1$] through [$PPAA_6,PPU_6$] equal a sequence of 111111111111. Thus, for each of a first through a sixth incident of a data fetching instruction, the predicted target data address has been correct and the predicted target data was off chip. Therefore, a prefetch operation would be highly beneficial and, thus, a prefetch operation is desirable. In any event, for this seventh instant programmable table 120 is addressed at its address of 111111111111 and suppose it outputs a prefetch code of 00. From Table 6, this code indicates that a prefetch operation is desirable. However, assume further that the seventh incident of the data fetching instruction produces a misprediction (PPAA=0) and the fetched data is on chip (PPU=0). Thus, the values of PPAA and PPU both equal to 0 are added as the most recent bits of the 2-bit pairs and, for the next data fetching instruction, that is, for the eighth incident, programmable table 120 will be addressed at its address of 111111111100 to output the appropriate prefetch code. In addition, however, the current values of PPAA and PPU from the seventh incident are used to update, if necessary, the prefetch code from the preceding incident (ie., the value of 00 output in response to the address of 111111111111 used in the sixth incident). Specifically, since the values of PPAA and PPU have now dropped due to the misprediction and off-chip hit, suppose further that the combination of these lower PPAA values and PPU values is addressed by some function (shown as f{PPAA,PPU} in Table 6) so that they are below a given threshold. Thus, according to Table 6, the prefetch code for address 111111111111 should be changed from 00 to 01. Thus, the next time the address 111111111111 is input to programmable table 120, it will output a value of 01 rather than 00. From this example, note then that the above may repeat at some later time, once again changing the prefetch code corresponding to the address 111111111111, either back to 00 or even to 10 (suggesting a prefetch operation is not desirable).

The above discussion of programmable table 120 suggests a single 120 programmable table 120 to be used by all LTB entries. However, note that in an alternative embodiment multiple tables could be used, even to the point where each LTB entry had its own corresponding programmable table 120. In this latter event, however, note that the amount of input bits (ie., the amount of history for PPAA and PPU) is preferably reduced. Otherwise, each of the 2048 LTB entries would require its own 4096 bit programmable table which is likely too large a structure to be practical. As yet another alternative, note further that entries for some data fetching instructions could access one programmable table while entries for other data fetching instructions access a different programmable table. For example, recall that the LTB entries may include an ACCESS TYPE value and, thus, one type of data fetching instruction could access a first programmable table while another type of data fetching instruction could access a second programmable table. Still other examples may be ascertained by one skilled in the art.

From the above, it may be appreciated that the above embodiments provide numerous benefits and advantages. For example, an LTB entry may be created with a value representing the accuracy of past predicted addresses. As another example, an LTB entry may be created with a value representing the usefulness of past prefetch operations for the data fetching instruction corresponding to the entry. Indeed, either of these values may be used either alone, or in combination, to indicate the desirability of performing future prefetch operations in response to future incidents of the data fetching instruction. Still further, these values may be used for various purposes, such as for overwriting older entries in an LTB, locating an entry in an LTB having varying length and/or purposes for its entries, and for determining whether a prefetch request should be issued or whether a prefetch operation should occur in response to an already-issued prefetch request In addition to these benefits, numerous different embodiments have been provided with considerable variance as to the implementation of certain aspects, yet all within the inventive scope. Consequently, while the present embodiments have been described in detail, various substitutions, modifications or alterations could be made to the descriptions set forth above without departing from that inventive scope which is defined by the following claims.

What is claimed is:

1. A microprocessor, comprising:
   a memory system for outputting data in response to an address, wherein the memory system is further operable to receive a prefetch request having a predicted target data address; and
   a load target circuit connected to said memory system for generating said predicted target data address, comprising:
      a first plurality of entries of a first length, wherein each of the first plurality of entries comprises:
         a first address tag for indicating a memory address of a corresponding one of a first plurality of data fetching instructions; and
         first prediction information for indicating a corresponding predicted target data address;
      a second plurality of entries of a second length different than the first length, wherein each of the second plurality of entries comprises a second address tag for indicating a memory address of a corresponding one of a second plurality of data fetching instructions;
   said load target circuit operative to compare a corresponding memory address of a decoded data fetching instruction with each first address tag and with each second address tag;
   said load target circuit operative to issue a prefetch request to said memory system for data at a corresponding predicted target data address upon a match of said memory address of a decoded data fetching instruction and one of said first address tags; and
   said load target circuit operative to inhibit issue of a prefetch request to said memory system upon a match of said memory address of a decoded data fetching instruction and one of said second address tags.

2. The microprocessor of claim 1:
   wherein the first prediction information enables prediction of target data addresses for each of the first plurality of data fetching instructions according to a first data pattern;
   and further comprising a third plurality of entries;
      wherein each of the third plurality of entries comprises a third address tag for indicating a corresponding one of a third plurality of data fetching instructions and second prediction information;
      wherein the second prediction information enables prediction of target data addresses for each of the third plurality of data fetching instructions according to a second data pattern.

3. The load target circuit of claim 2:
   wherein each of the first plurality of data fetching instructions is predicted to have a looping pattern such that, for each of the first plurality of data fetching instructions, the corresponding target data address advances from a first target data address through at least one intermediate address to a last target data address and back to the first target data address
   wherein each of the third plurality of data fetching instructions is predicted to have a striding pattern followed by a looping pattern;
   wherein the striding pattern is such that, for each of the third plurality of data fetching instructions, the corresponding target data address advances from a first target data address through a plurality of additional target data addresses, wherein the data target address of each of the plurality of additional target data addresses has a stride length as the difference between itself and a data target address of an immediately preceding target data address; and
   wherein the looping pattern following the striding pattern is such that, for each of the third plurality of data fetching instructions, the corresponding target data address advances from a first target data address through at least one intermediate address to a last target data address and back to the first target data address.

4. The microprocessor of claim 3:
   wherein the second plurality of entries greater are greater in number than the first plurality of entries; and
   wherein the first plurality of entries greater are greater in number than the third plurality of entries.

5. The microprocessor of claim 2:
  wherein the second plurality of entries are greater in number than the first plurality of entries; and
  wherein the second plurality of entries are greater in number than the third plurality of entries.

6. The microprocessor of claim 1 wherein the second plurality of entries are greater in number than the first plurality of entries.

7. The microprocessor of claim 1 further comprising:
  a data fetching execution unit operative to compute a target data address and fetch data from said memory system at said target data address in response to a data fetching instruction;
  wherein said load target circuit is operative to compare each target data address with a corresponding predicted target data address; and
  wherein each of the first plurality of entries further comprises a past predicted address accuracy portion storing a value indicating a past predicted accuracy of the corresponding predicted target data address computed from a history of results of said comparisons of said predicted target data address and said corresponding target data address.

8. The microprocessor of claim 7:
  wherein said past predicted address portion storing said value indicating a past predicted accuracy comprises a counter;
  wherein the counter advances in a first direction in response to detection of a match upon comparing a target data address with the corresponding predicted target data address; and
  wherein the counter advances in a second direction opposite the first direction in response to detection of a nonmatch upon comparing a target data address with the corresponding predicted target data address.

9. The microprocessor of claim 7:
  wherein said past predicted address portion storing said value indicating a past predicted accuracy comprises a series of binary indicators; and
  wherein each of the binary indicators in the series reflects detection of a match or a nonmatch upon comparing a target data address with the predicted target data address over a corresponding series of past incidents of the data fetching instruction corresponding to the entry.

10. The microprocessor of claim 1 wherein:
  said memory system includes a bus interface unit to an external memory and a cache memory;
  a data fetching execution unit operative to compute a target data address and fetch data from said memory system at said target data address in response to a data fetching instruction;
  wherein said load target circuit is operative to detect whether each data fetching instruction generates a cache hit or a cache miss; and
  wherein each of the first plurality of entries further comprises a past prefetch usefulness value for indicating whether at least one prior past incident of the data fetching instruction corresponding to the entry generated a cache hit or a cache miss.

11. The microprocessor of claim 10:
  wherein the past prefetch usefulness value comprises a counter;
  wherein the counter advances in a first direction in response to detecting that a prior past incident of the data fetching instruction generated a cache hit; and
  wherein the counter advances in a second direction opposite the first direction in response to detecting that a prior past incident of the data fetching instruction generated a cache miss.

12. The microprocessor of claim 10:
  wherein the past prefetch usefulness value comprises a series of binary indicators; and
  wherein each of the binary indicators in the series reflects whether a prior past incident of the data fetching instruction generated a cache hit or a cache miss.

13. The microprocessor of claim 1 wherein the first length is greater than the second length.

14. The microprocessor of claim 1 wherein the data fetching instruction is a load instruction.

15. The microprocessor of claim 1 wherein the data fetching instruction is a store instruction.

16. A microprocessor, comprising:
  a memory system for outputting data in response to an address, wherein the memory system is further operable to receive a prefetch request having a predicted target data address;
  a data fetching execution unit operative to compute a target data address and fetch data from said memory system at said target data address in response to a data fetching instruction;
  a load target circuit connected to said memory system for generating said predicted target data address, operative to compare each target data address with a corresponding predicted target data address, and comprising a plurality of entries, wherein each of the plurality of entries comprises:
    an address tag indicating a memory address of a corresponding data fetching instruction;
    a pointer indicating a corresponding predicted target data address; and
    a past predicted address accuracy portion storing a value indicating a past predicted accuracy of the corresponding predicted target data address computed from a history of results of said comparisons of said predicted target data address and said corresponding target data address;
  said load target circuit operative to compare a corresponding memory address of a decoded data fetching instruction with each address tag; and
  said load target circuit operative to issue a prefetch request to said memory system for data at a corresponding predicted target data address upon a match of said memory address of a decoded data fetching instruction and said address tag of one of said entries.

17. The microprocessor of claim 16:
  wherein said past predicted address portion storing said value indicating a past predicted accuracy comprises a counter;
  wherein the counter advances in a first direction in response to detection of a match upon comparing a target data address with the corresponding predicted target data address; and
  wherein the counter advances in a second direction opposite the first direction in response to detection of a nonmatch upon comparing a target data address with the corresponding predicted target data address.

18. The microprocessor of claim 16:
  wherein said past predicted address portion storing said value indicating a past predicted accuracy comprises a series of binary indicators; and wherein each of the binary indicators in the series reflects detection of a match or a nonmatch upon comparing a target data address with the predicted target data address over a corresponding series of past incidents of the data fetching instruction corresponding to the entry.

19. The microprocessor of claim 16 wherein:

said memory system includes a bus interface unit to an external memory and a cache memory;

wherein said load target circuit is operative to detect whether each data fetching instruction generates a cache hit or a cache miss; and wherein each of the first plurality of entries further comprises a past prefetch usefulness value for indicating whether a prior past incident of the data fetching instruction corresponding to the entry generated a cache hit.

20. The microprocessor of claim 19:

wherein the past prefetch usefulness value comprises a counter;

wherein the counter advances in a first direction in response to detecting that a prior past incident of the data fetching instruction generated a cache hit; and wherein the counter advances in a second direction opposite the first direction in response to detecting that a prior past incident of the data fetching instruction generated a cache miss.

21. The microprocessor of claim 19:

wherein the past prefetch usefulness value comprises a series of binary indicators; and wherein each of the binary indicators in the series reflects whether a prior past incident of the data fetching instruction generated a cache hit or a cache miss.

22. A microprocessor, comprising:

a memory system for outputting data in response to an address, wherein the memory system is further operable to receive a prefetch request having a predicted target data address, said memory system including a bus interface unit connected to an external memory and a cache memory;

a data fetching execution unit operative to compute a target data address and to fetch data from said memory system at said target data address in response to a data fetching instruction;

a load target circuit operative to detect whether each data fetching instruction generates a cache hit or a cache miss, said load target buffer comprising a plurality of entries, wherein each of the plurality of entries comprises:

an address tag for indicating a memory address of a corresponding data fetching instruction;

a pointer for indicating a corresponding predicted target data address; and a past prefetch usefulness value indicating whether at least one prior past incident of the data fetching instruction corresponding to the entry generated a cache hit or a cache miss;

said load target circuit operative to compare a corresponding memory address of a decoded data fetching instruction with each address tag; and said load target circuit operative to issue a prefetch request to said memory system for data at a corresponding predicted target data address upon a match of said memory address of a decoded data fetching instruction and said address tag of one of said entries.

23. The microprocessor of claim 22:

wherein the past prefetch usefulness value comprises a counter;

wherein the counter advances in a first direction in response to detecting that a prior past incident of the data fetching instruction generated a cache hit; and wherein the counter advances in a second direction opposite the first direction in response to detecting that a prior past incident of the data fetching instruction generated a cache miss.

24. The microprocessor of claim 22:

wherein the past prefetch usefulness value comprises a series of binary indicators; and wherein each of the binary indicators in the series reflects whether a prior past incident of the data fetching instruction generated a cache hit or a cache miss.

25. A method of operating a microprocessor having an instruction pipeline and a load target buffer, comprising the steps of:

storing a plurality of entries in the load target buffer, each entry including an address tag, target data address prediction information and an indication of past prediction accuracy;

receiving a data fetching instruction in the instruction pipeline, wherein the data fetching instruction has a corresponding memory address;

upon a data fetching instruction reaching a predetermined stage in the instruction pipeline comparing a memory address of the data fetching instructions with an address tag of each entry in the load target buffer;

if the memory address of a data fetching instruction matches the address tag of an entry in the load target buffer:

generating a prefetch request to a memory system at an address calculated from the target address prediction information;

updating the indication of past prediction accuracy to indicate more accurate past prediction; and if the memory address of a data fetching instruction does not match the address tags of any entry in the load target buffer:

identifying a group of entries in the load target buffer on the microprocessor, wherein the identified group is a group in which target data address prediction information corresponding to the received data fetching instruction may be stored based on the corresponding memory address;

identifying a least recently used entry from the identified group of entries;

in response to the value for indicating a past predicted accuracy falling below a predetermined threshold, overwriting the identified entry with target data address prediction information corresponding to the received data fetching instruction;

updating the indication of past prediction accuracy to indicate less accurate past prediction; and upon a data fetching instruction reaching a second predetermined state in the instruction pipeline computing a target data address; and fetching data from said memory system at said target data address in response to a data fetching instruction.

26. A method of operating a microprocessor having, a cache memory, an instruction pipeline and a load target buffer, comprising the steps of:

storing a plurality of entries in the load target buffer, each entry including an address tag, target data address prediction information and an indication of past prediction usefulness;

receiving a data fetching instruction in the instruction pipeline, wherein the data fetching instruction has a corresponding memory address;

upon a data fetching instruction reaching a first predetermined stage in the instruction pipeline comparing a memory address of the data fetching instructions with an address tag of each entry in the load target buffer;

if the memory address of a data fetching instruction matches the address tag of an entry in the load target buffer:
generating a prefetch request to a memory system at an address calculated from the target address prediction information; and if the memory address of a data fetching instruction does not match the address tag of any entry in the load target buffer:
identifying a group of entries in the load target buffer on the microprocessor, wherein the identified group is a group in which target data address prediction information corresponding to the received data fetching instruction may be stored based on the corresponding memory address;
identifying a least recently used entry from the identified group of entries;
in response to the indication of past prefetch usefulness falling below a predetermined threshold, overwriting the identified entry with target data address prediction information corresponding to the received data fetching instruction; and upon a data fetching instruction reaching a second predetermined state in the instruction pipeline:
computing a target data address;
fetching data from said memory system at said target data address in response to a data fetching instruction;
detecting whether each data fetching instruction generates a cache hit or a cache miss; and
updating the indication of past prefetch usefulness to indicate more usefulness upon a cache hit and to indicate less usefulness upon a cache miss.

27. A method of operating a microprocessor having, a cache memory, an instruction pipeline and a load target buffer, comprising the steps of:
storing a plurality of entries in the load target buffer, each entry including an address tag, target data address prediction information, an indication of past prediction accuracy and an indication of past prediction usefulness;
receiving a data fetching instruction in the instruction pipeline, wherein the data fetching instruction has a corresponding memory address;
upon a data fetching instruction reaching a first predetermined stage in the instruction pipeline comparing a memory address of the data fetching instructions with an address tag of each entry in the load target buffer;
if the memory address of a data fetching instruction matches the address tag of an entry in the load target buffer:
generating a prefetch request to a memory system at an address calculated from the target address prediction information;
updating the indication of past prediction accuracy to indicate more accurate past prediction; and
if the memory address of a data fetching instruction does not match the address tags of any entry in the load target buffer:
identifying a group of entries in the load target buffer on the microprocessor, wherein the identified group is a group in which target data address prediction information corresponding to the received data fetching instruction may be stored based on the corresponding memory address;
identifying a least recently used entry from the identified group of entries;
updating the indication of past prediction accuracy to indicate less accurate past prediction;
in response to a combination of the value for indicating a past predicted accuracy combined with the past prefetch usefulness value falling below a predetermined threshold, overwriting the identified entry with target data address prediction information corresponding to the received data fetching instruction; and upon a data fetching instruction reaching a second predetermined state in the instruction pipeline:
computing a target data address;
fetching data from said memory system at said target data address in response to a data fetching instruction;
detecting whether each data fetching instruction generates a cache hit or a cache miss; and
updating the indication of past prefetch usefulness to indicate more usefulness upon a cache hit and to indicate less usefulness upon a cache miss.

28. A method of operating a microprocessor having an instruction pipeline and a load target buffer, comprising the steps of:
storing a plurality of entries in the load target buffer, each entry including an address tag, target data address prediction information and an indication of past prediction accuracy;
receiving a data fetching instruction in the instruction pipeline, wherein the data fetching instruction has a corresponding memory address;
upon a data fetching instruction reaching a first predetermined stage in the instruction pipeline comparing a memory address of the data fetching instructions with an address tag of each entry in the load target buffer;
if the memory address of a data fetching instruction matches the address tag of an entry in the load target buffer:
generating a prefetch request to a memory system at an address calculated from the target address prediction information;
updating the indication of past prediction accuracy to indicate more accurate past prediction; and
if the memory address of a data fetching instruction does not match the address tags of any entry in the load target buffer:
identifying a group of entries in the load target buffer on the microprocessor, wherein the identified group is a group in which target data address prediction information corresponding to the received data fetching instruction may be stored based on the corresponding memory address;
identifying a particular entry from the identified group of entries;
in response to the value for indicating a past predicted accuracy falling below a predetermined threshold, overwriting the identified entry with target data address prediction information corresponding to the received data fetching instruction;
updating the indication of past prediction accuracy to indicate less accurate past prediction;
upon a data fetching instruction reaching a second predetermined state in the instruction pipeline;
computing a target data address; and
fetching data from said memory system at said target data address in response to a data fetching instruction.

29. A method of operating a microprocessor having, a cache memory, a n instruction pipeline and a load target buffer, comprising the steps of:

storing a plurality of entries in the load target buffer, each entry including an address tag, target data address prediction information and an indication of past prediction usefulness;

receiving a data fetching instruction in the instruction pipeline, wherein the data fetching instruction has a corresponding memory address;

upon a data fetching instruction reaching a first predetermined stage in the instruction pipeline comparing a memory address of the data fetching instructions with an address tag of each entry in the load target buffer;

if the memory address of a data fetching instruction matches the address tag of an entry in the load target buffer:

generating a prefetch request to a memory system at an address calculated from the target address prediction information and if the memory address of a data fetching instruction does not match the address tag of any entry in the load target buffer:

identifying a group of entries in the load target buffer on the microprocessor, wherein the identified group is a group in which target data address prediction information corresponding to the received data fetching instruction may be stored based on the corresponding memory address;

identifying a least recently used entry from the identified group of entries;

in response to the indication of past prefetch usefulness falling below a predetermined threshold, overwriting the identified entry with target data address prediction information corresponding to the received data fetching instruction; and upon a data fetching instruction reaching a second predetermined state in the instruction pipeline:

computing a target data address;

fetching data from said memory system at said target data address in response to a data fetching instruction;

detecting whether each data fetching instruction generates a cache hit or a cache miss; and updating the indication of past prefetch usefulness to indicate more usefulness upon a cache hit and to indicate less usefulness upon a cache miss.

30. A method of operating a microprocessor having, a cache memory, an instruction pipeline and a load target buffer, comprising the steps of:

storing a plurality of entries in the load target buffer, each entry including an address tag, target data address prediction information, an indication of past prediction accuracy and an indication of past prediction usefulness;

receiving a data fetching instruction in the instruction pipeline, wherein the data fetching instruction has a corresponding memory address;

upon a data fetching instruction reaching a first predetermined stage in the instruction pipeline comparing a memory address of the data fetching instructions with an address tag of each entry in the load target buffer;

if the memory address of a data fetching instruction matches the address tag of an entry in the load target buffer:

generating a prefetch request to a memory system at an address calculated from the target address prediction information;

updating the indication of past prediction accuracy to indicate more accurate past prediction; and if the memory address of a data fetching instruction does not match the address tags of any entry in the load target buffer:

identifying a group of entries in the load target buffer on the microprocessor, wherein the identified group is a group in which target data address prediction information corresponding to the received data fetching instruction may be stored based on the corresponding memory address;

identifying a particular entry from the identified group of entries;

updating the indication of past prediction accuracy to indicate less accurate past prediction;

in response to a combination of the value for indicating a past predicted accuracy combined with the past prefetch usefulness value falling below a predetermined threshold, overwriting the identified entry with target data address prediction information corresponding to the received data fetching instruction; and upon a data fetching instruction reaching a second predetermined state in the instruction pipeline:

computing a target data address;

fetching data from said memory system at said target data address in response to a data fetching instruction;

detecting whether each data fetching instruction generates a cache hit or a cache miss; and updating the indication of past prefetch usefulness to indicate more usefulness upon a cache hit and to indicate less usefulness upon a cache miss.

31. A method of operating a microprocessor having an instruction pipeline and a load target buffer, comprising the steps of:

storing a plurality of entries in the load target buffer, each entry including an address tag, a plurality of address pointers each storing a corresponding target data address and an indication of a next address pointer;

receiving a data fetching instruction in the instruction pipeline, wherein the data fetching instruction has a corresponding memory address;

upon a data fetching instruction reaching a first predetermined stage in the instruction pipeline comparing a memory address of the data fetching instructions with an address tag of each entry in the load target buffer;

if the memory address of a data fetching instruction matches the address tag of an entry in the load target buffer:

generating a prefetch request to a memory system at an address corresponding to the target data address stored in the address pointer indicated by the indication of a next address pointer; and updating the indication of a next address pointer to indicate a next address pointer in a circular sequence of the plurality of address pointers;

upon a data fetching instruction reaching a second predetermined state in the instruction pipeline;

computing a target data address; and fetching data from said memory system at said target data address.

32. A method of operating a microprocessor having an instruction pipeline and a load target buffer, comprising the steps of:

storing a plurality of entries in the load target buffer, each entry including an address tag, a plurality of address pointers each storing a corresponding target data address, an indication of a next address pointer, a mode indicator indicating a looping mode or a striding/looping mode, a stride length, a stride threshold and a stride counter;

receiving a data fetching instruction in the instruction pipeline, wherein the data fetching instruction has a corresponding memory address;

upon a data fetching instruction reaching a first predetermined stage in the instruction pipeline comparing a memory address of the data fetching instructions with an address tag of each entry in the load target buffer;

if the memory address of a data fetching instruction matches the address tag of an entry in the load target buffer and the mode indicator indicates a looping mode:
generating a prefetch request to a memory system at an address corresponding to the target data address stored in the address pointer indicated by the indication of a next address pointer; and
updating the indication of a next address pointer to indicate a next address pointer in a circular sequence of the plurality of address pointers;

if the memory address of a data fetching instruction matches the address tag of an entry in the load target buffer and the mode indicator indicates a striding/looping mode and the stride counter is zero:
initializing the stride counter with the stride threshold;
generating a prefetch request to the memory system at an address corresponding to the target data address stored in the address pointer indicated by the indication of a next address pointer;
adding the stride length to the address pointer indicated by the indication of a next address pointer;
decrementing the stride counter; and
if the stride counter has decremented to zero restoring the address pointer to an initial value and updating the indication of a next address pointer to indicate a next address pointer in a circular sequence of the plurality of address pointers;

if the memory address of a data fetching instruction matches the address tag of an entry in the load target buffer and the mode indicator indicates a striding/looping mode and the stride counter is not zero:
generating a prefetch request to the memory system at an address corresponding to the target data address stored in the address pointer indicated by the indication of a next address pointer;
adding the stride length to the address pointer indicated by the indication of a next address pointer;
decrementing the stride counter; and
if the stride counter has decremented to zero restoring the address pointer to an initial value and updating the indication of a next address pointer to indicate a next address pointer in a circular sequence of the plurality of address pointers;

upon a data fetching instruction reaching a second predetermined state in the instruction pipeline;
computing a target data address; and
fetching data from said memory system at said target data address.

33. A method of operating a microprocessor having an instruction pipeline, a cache memory and a load target buffer, comprising the steps of:

storing a plurality of entries in the load target buffer, each entry including an address tag and target data address prediction information;

receiving a data fetching instruction in the instruction pipeline, wherein the data fetching instruction has a corresponding memory address;

upon a data fetching instruction reaching a first predetermined stage in the instruction pipeline comparing a memory address of the data fetching instructions with an address tag of each entry in the load target buffer;

if the memory address of a data fetching instruction matches the address tag of an entry in the load target buffer
generating a prefetch request to the cache memory at an address corresponding to the target data address stored in the address pointer indicated by the indication of a next address pointer;
determining if data at the target data address is stored in the cache memory; and
if the data at the target data address is not stored in the cache memory initiating a cache line fill operation from a higher level memory;

upon a data fetching instruction reaching a second predetermined state in the instruction pipeline;
computing a target data address; and
fetching data from said memory system at said target data address.

34. The method of claim 33, further comprising the steps of:

inhibiting generation of a data prefetch if a predicted target data address occupies the same cache line as the predicted target data address of prior prefetch request.

* * * * *